(12) United States Patent
Belenkii et al.

(10) Patent No.: US 11,079,234 B2
(45) Date of Patent: Aug. 3, 2021

(54) HIGH PRECISION—AUTOMATED CELESTIAL NAVIGATION SYSTEM

(71) Applicants: Mikhail Belenkii, San Diego, CA (US); Timothy Brinkley, San Diego, CA (US)

(72) Inventors: Mikhail Belenkii, San Diego, CA (US); Timothy Brinkley, San Diego, CA (US)

(*) Notice: Subject to any disclaimer, the term of this patent is extended or adjusted under 35 U.S.C. 154(b) by 182 days.

(21) Appl. No.: 16/602,070

(22) Filed: Jul. 29, 2019

(65) Prior Publication Data

US 2021/0033400 A1 Feb. 4, 2021

(51) Int. Cl.
| | |
|---|---|
| *G01C 21/02* | (2006.01) |
| *G01C 21/20* | (2006.01) |
| *G01S 3/786* | (2006.01) |
| *G01S 19/39* | (2010.01) |
| *G02B 23/24* | (2006.01) |

(52) U.S. Cl.
CPC ......... *G01C 21/025* (2013.01); *G01C 21/203* (2013.01); *G01S 3/7867* (2013.01); *G01S 19/393* (2019.08); *G02B 23/2407* (2013.01)

(58) Field of Classification Search
CPC .. G01C 21/025; G01C 21/203; G01C 21/165; G02B 23/2407; G01S 19/393; G01S 3/7867
See application file for complete search history.

(56) References Cited

U.S. PATENT DOCUMENTS

2020/0256678 A1* 8/2020 Li ................. G01C 21/165

OTHER PUBLICATIONS

"Dual-band single-pixel telescope" Yiwei Zhang, Graham M Gibson, Matthew P Edgar, Giles Hammond, Miles J Padgett Opt Express. Jun. 8, 2020;28(12):18180-18188. doi: 10.1364/OE.392522. PMID: 32680019.*

* cited by examiner

*Primary Examiner* — Brian P Sweeney
(74) *Attorney, Agent, or Firm* — John R. Ross; John R. Ross, III

(57) ABSTRACT

A dual-band (SWIR/visible) optical system operating based on Angles-Only Navigation technology. The SWIR module is optimized for imaging stars. The visible-light sensor is independently optimized for imaging satellites including GPS satellites at night. Preferred embodiment provides continuous high accuracy geo-position solutions day and night (including through the "midnight hole", when solar-illuminated Low Earth Orbit (LEO) satellites are not available. Applicants have experimentally validated proposed system by imaging LEO satellites during terminator using a 1-inch diameter telescope and GPS satellites at night during midnight hole using a 5-inch telescope.

11 Claims, 15 Drawing Sheets

HIGH PRECISION—AUTOMATED CELESTIAL NAVIGATION SYSTEM

CROSS REFERENCE TO PRIOR APPLICATIONS

This application claims the benefit of Provisional Patent Application Ser. No. 764,374, filed Jul. 30, 2018

BACKGROUND OF THE INVENTION

GPS

The Global Positioning System (GPS) is a space-based satellite navigation system that provides location and time information in all weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

The GPS project was developed in 1973 to overcome the limitations of previous navigation systems, integrating ideas from several predecessors, including a number of classified engineering design studies from the 1960s. GPS was created and realized by the U.S. Department of Defense (DoD) and was originally run with 24 satellites. It became fully operational in 1995. In some situations GPS may not be available. It can be jammed or interfered with to provide false information.

Global Navigation Satellite System

The Global Navigation Satellite System is a satellite navigation system that uses satellites to provide autonomous geo-spatial positioning. It allows small electronic receivers to determine their location (longitude, latitude, and altitude/elevation) to high precision (within a few meters) using time signals transmitted along a line-of-sight by radio from satellites. The system can be used for providing position, navigation or for tracking the position of something fitted with a GPS receiver. The signals also allow the electronic receiver to calculate the current local time to high precision, which allows time synchronization.

An Inertial Measurement Unit (IMU) can mitigate the effects of GPS denial. However, gyro errors (attitude), accelerometer errors (position and velocity), and the "cross product" of acceleration and attitude errors accumulate over time. Consequently, the IMU precision can drift outside mission required accuracy. A star tracker potentially can provide periodic updates to bound position and attitude errors in the IMU. However, a conventional star tracker on a moving platform has a limitation. It can determine precision attitude fix (pitch, roll and yaw) by imaging two, or more, bright starts separated by a large angular distance. It cannot however determine position fix with respect to terrestrial reference frame. The latter is because a local vertical reference is required in conventional star trackers to determine position fix from the star measurements. Since neither an accelerometer nor a tilt meter can discriminate between gravity force and acceleration, measurements of the local vertical on a moving platform are very difficult. This places a fundamental limitation on utility of conventional star trackers for marine vessels and aircraft. The IMU is the main component of an Inertial Navigation System (INS).

LEO, MEO and GSO Satellites

Geocentric orbits at altitudes between 160 to 2,000 km are treated as Low Earth Orbits (LEOs). Geocentric orbits at altitudes of between 2,000 to just below 35,786 km are treated as Medium Earth Orbits (MEOs). Geo-Synchronous Orbits (GSO) are at an altitude of 35,786 km. GPS satellites are at an altitude of 20,000 km. Global Star Satellites are communication satellites and orbit at about 1,500 km

GPNTS

The Global Positioning, Navigation and Timing Service (GPNTS) is a system managed by the United States Navy's Space and Naval Warfare Command for the support of real time positioning, navigation and timing (PNT) data services for weapons, combat navigation and other systems requiring PNT information. The Navy's GPNTS prime contractor is Raytheon Integrated Defense Systems with offices in San Diego, Calif.

Kalman Filters

The Kalman filter is an algorithm that uses a series of measurements from different sensors observed over time, containing noise (random variations) and other inaccuracies, and produces estimates of unknown variables that tend to be more precise than those based on a single measurement alone. The Kalman filter operates recursively on streams of noisy input data to produce a statistically optimal estimate of the underlying system state. A common application for the Kalman filter is for guidance, navigation and control of vehicles, particularly aircraft and spacecraft. The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state and its uncertainty matrix; no additional past information is required.

Applicants Prior Celestial Navigation Patents

Applicants and their fellow workers have developed and field demonstrated a High Accuracy Automated Celestial Navigation System (HP-ACNS) for navigation of surface ships and aircraft. See U.S. Pat. No. 7,349,803, Daytime Stellar Imager and U.S. Pat. No. 7,447,591, issued Nov. 4, 2008, Daytime Stellar Imager for Attitude Determination, and U.S. Pat. No. 9,217,643, Angles Only Navigation System; all three granted to two of the present inventors. The teachings of these patents s are incorporated herein by reference.

What is needed is a new approach, independent of the local vertical, or gravity vector measurements on a moving platform to provide periodic celestial updates day and night, in good weather and in partly cloudy sky conditions to correct navigation errors in the INS.

SUMMARY OF THE INVENTION

The present invention provides a dual-band (SWIR/visible) optical system operating based on Angles-Only Navigation technology. The SWIR module is optimized for imaging stars at daytime. The visible-light sensor is independently optimized for imaging dim celestial objects including GPS satellites at night. Preferred embodiments provide continuous celestial solutions day and night (including through the "midnight hole", when solar-illuminated Low Earth Orbit satellites are not available). Applicates validated performance of the proposed dual-band system using detailed radiometry and error budget analysis. In addition, Applicants have experimentally demonstrated performance of the celestial navigator by imaging LEO satellites at terminator using a 1-inch diameter telescope and GPS satellites at night using a 5-inch telescope.

Applicants' novel sheared-aperture automated dual-band telescope design permits an ultra-compact optical train, minimizing payload size and weight for the stabilized pointing mount. The above-deck sub-system weighs less than 100 pounds and fits within a one-half meter cube. Using two imaging sensors and two camera shutters, the HP-ACNS can independently and simultaneously detect both satellites and stars. When the pointing mount tracks the Satellite with one sensor, a second sensor with different shutter rate and shift-and-add image stabilization technique is used to obtain star images containing single or multiple short exposures.

A preferred embodiment of the present invention is a high precision, automated dual band celestial navigation system for marine vessels with an above-deck dual-band sheared-aperture telescope mounted on a gyro-stabilized four-axis pointing platform, adapted to image satellites and nearby stars within fields of view of the telescope, both day and night. It includes a dual-band optical system comprising: (1) a beam splitter adapted to separate light from the fields of view of the telescope into a visible light beam and a shortwave infrared beam, (2) a shortwave infrared camera adapted to record light from the shortwave infrared beam and to create images of stars within the telescope field of view, said shortwave infrared camera comprising an adjustable shortwave shutter with controls adapted to automatically control the shutter speed and a shortwave infrared sensor. It also comprises (3) a visible light camera adapted to collect light from the visible light beam and create images of satellites within the telescope field of view, said visible light camera with a visible light shutter with controls adapted to automatically control the shutter speed and a visible light sensor. The preferred embodiment also comprises a processing unit adapted to function as a part of a position, navigation and timing (PNT) system, said processing unit having an inertial measurement unit co-located with the telescope and a computer processing unit programmed with an image processing algorithm, pointing algorithms, star and RSO catalogs, an Unscented Kalman filter, navigation algorithms, an all sky monitor algorithm, system control software, and interface software to the PNT system.

The processing unit may be located below deck on the marine vessel. Embodiment may further include an all sky monitoring system which provides an automated detection of clear line-of-sight to available satellites in partly cloudy sky and/or a fast steering mirror adapted to provide point-like control positions of the visible light beam on the visible light sensor when the telescope is tracking a satellite. The system may be combined with a position, navigation and timing (PNT) system adapted to maintain position of the marine vehicle based on inertial measurement information when other sources of vehicle position information is not available. Other preferred embodiments may include electronics adapted to control the telescope, the dual band optical system and the PNT system, above deck and below deck communications. The all sky monitoring system may include an automated detection of clear line-of-sight to available satellites in partly cloudy sky. In preferred embodiments the system is capable of geo-position determination of the marine vessels without GPS to within 5 meters during daytime and 20 meters during nighttime with a guaranteed geo-position determination of 25 meters during daytime and 100 meters during nighttime. In preferred embodiments the telescope is a catodioptric telescope. In preferred embodiments the star catalog star is a Skymark catalog, and the RSO catalog is a United Space Command catalog.

DETAILED DESCRIPTION OF PREFERRED EMBODIMENTS

Figure 1:
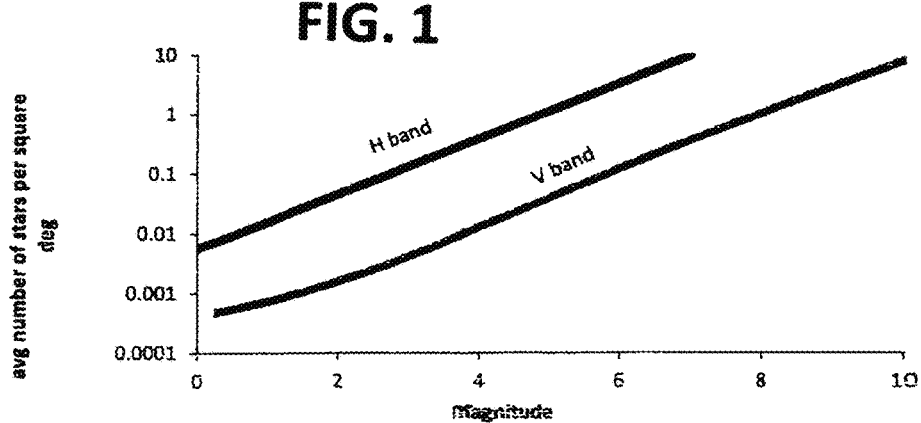
FIG. 1 is a drawing showing the number of stars in the field of view of one square degree vs star magnitude for H-band and V-bans light.
Figure 3:
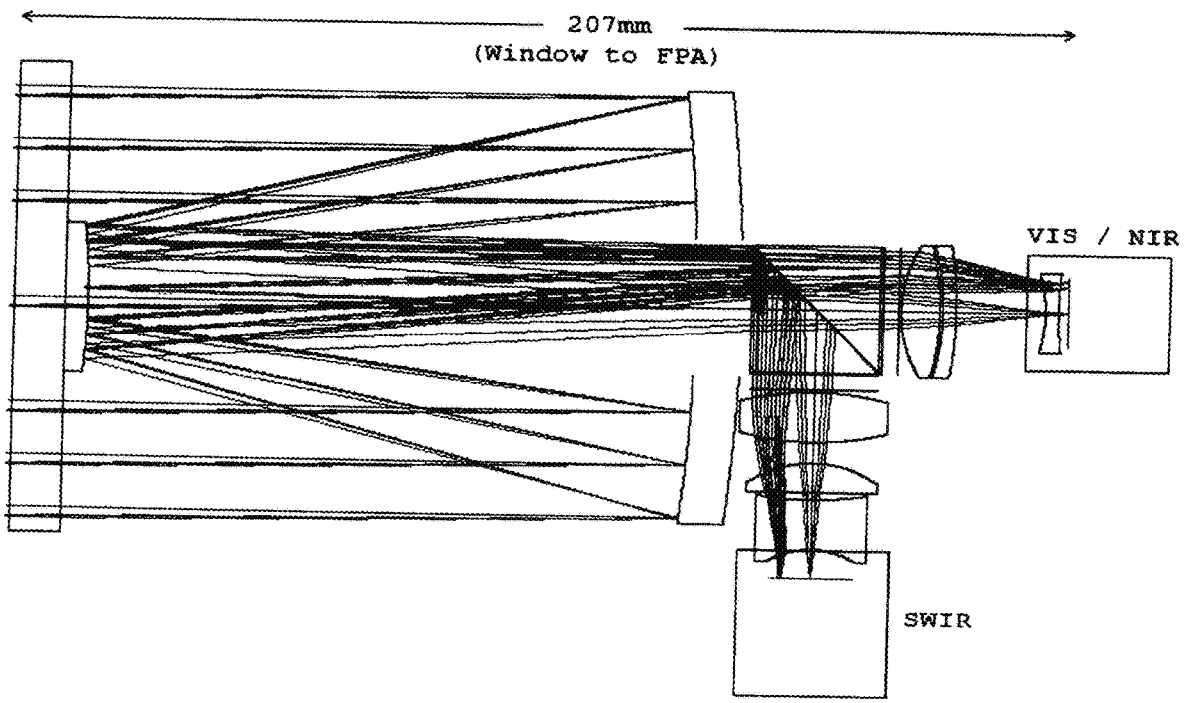
FIG. 3 is a sketch showing basic concept and components of a visible/shortwave IR optical system.

Preferred embodiments of the present invention include high precision, automated dual-band celestial navigation system for marine vessels with an above-deck optical payload mounted on a gyro-stabilized four-axis pointing platform, adapted to image satellites and nearby stars within field of view (FOV) of the telescope, both day and night and a dual-band optical system including a dichroic beam splitter adapted to separate light from the fields of view of the telescope into a visible light beam and a short wave infrared beam, a short wave infrared sensor adapted to monitor light from the short wave infrared beam and create images of stars within the telescope field of view and a visible light sensor adapted to monitor light from the visible light beam and create images of satellites within the telescope field of view. Preferred embodiments include independent camera shutters for each of the SWIR sensor and the visible light sensor. The optical payloads include a local inertial measurement unit (IMU) KVH-1775 used for pointing telescope at selected stars and satellites and line-of-sight stabilization.

Preferred embodiments also include a processing module. The processing module includes a computer processing unit programmed with: a) celestial objects selection and planning algorithm, b) pointing algorithm, c) an image processing algorithm, d) star and satellites catalogs, e) navigation algorithm, f) navigation Unscented Kalman Filter (UKF), g) an all sky monitor algorithm, f) system control software, and h) interface software to the gimbal and GPNTS system. Embodiments also include electronics adapted to point the telescope, control the dual band optical system, receive and transmit messages from GPNTS system and above deck and below deck communications. For additional precision embodiments include a fast steering mirror (FSM) in the optical train of the telescope adapted to provide fast control of positions of the visible light beam on the visible light sensor providing stabilized images of relative position of satellite and permitting simultaneous tracking of both satellites and stars moving or appearing to move at different angular rates. This eliminates the need for digital "shift-and-add" tracking and stabilization algorithm, increases radiometric signal to noise ratio (SNR) and geo-position accuracy. With these features the system is capable of geo-position determination of the marine vessels without GPS to within 5 meters during daytime and 20 meters during nighttime with a guaranteed geo-position determination of 25 meters during daytime and 100 meters during nighttime.

Embodiments represent substantial improvement in Applicants' prior art Angles Only Navigation (AON) technology development referenced in the Background section. In addition, Applicants have designed the ACNS processing unit to fit within the existing Raytheon's GPNTS rack. Preferred embodiments operate automatously without the help of an operator and without human intervention.

The ACNS operates as the following: i) it receives standard GPNTS multicast message at 50 Hz including ship position, orientation and time, ii) using position estimate (within 10 km) and time (within 1 msec) from GPNTS, ACNS determines satellite and star position above the horizon; iii) 4-axis gimbal steers the optical LOS to a predicted satellite track, iv) satellite and star imagery is collected as satellite moves across the field-of-view and processed, v) stars in the FOV of the sensor are identified using star pattern recognition algorithm and telescope pointing direction and camera orientation are determined; vi) ship geo-position is determined using navigation algorithm and predicted and measured satellite position on a focal plane array (FPA); vii) celestial solutions from different satellites are optimally fused using an the UKF; viii) the ship geo-position, measurement accuracy and measurement time are transmitted to GPNTS.

Operation of the ACNS (especially exposure times) depends on the time of day as explained in the Summary of Operational Performance shown in Table 1, when SWIR sensor detects star images at daytime using 33 msec exposures, the visible sensor detects a LEO satellite using independently optimized 0.5 msec exposures. (Because the number of stars in the telescope field of view (FOV) for the SWIR sensor exceeds the number of stars in the visible band by a factor of 10×, the HP-ACNS provides higher update rate and higher availability of celestial solutions than a single-band system visible system. During terminator, the corresponding ratio of the number of stars in the FOV is equal to 26×. This further increases the availability of celestial solutions provided by the dual-band system.) Table 1 is divided into day, night and terminator. Terminator is generally after dark and before sunrise when the sky is dark, but satellites may still be illuminated by the sun.

TABLE 1

Summary of Operational Performance

| | Mode | | | | | |
|---|---|---|---|---|---|---|
| | Day | | Terminator sensor | | Night | |
| | visible | SWIR | Visible | SWIR | Visible | SWIR |
| exposure (msec) | 0.5 | 33 | 22 | 22 | 500 | 15 |
| meas time (msec) | 120 | 33 | 22 | 22 | 500 | 15 |
| V-mag detect (5900K blackbody spectrum) | 5 | 5 | 7 | 7 | GPS det ~10-12 | ~6.5 |
| H-mag detect | n/a | 3.7 | n/a | 7 | n/a | 6.5 |

TABLE 1-continued

Summary of Operational Performance

| | Mode | | | | | |
|---|---|---|---|---|---|---|
| | Day | | Terminator sensor | | Night | |
| | visible | SWIR | Visible | SWIR | Visible | SWIR |
| avg # stars in field | 0.05 | 0.5 | 0.36 | 9.5 | ~8 | 5.7 |
| field rotation about axis determined by: | INS + xfer align | INS + xfer align | H-band stars + boresight | H-band stars | V-band stars | H-band stars |

A SWIR sensor has several principal advantages for imaging stars at daytime, as compared to visible-band sensor i) daytime sky background is lower by a factor of 8× at longer wavelength than that in the visible; ii) the number of IR stars is larger by a factor of 10× than the number of stars in the visible; iii) the full well capacity of SWIR sensors is larger (800 Ke/pixel vs 25 Ke/pixel) than that in the visible, and iv) effect of atmospheric obscurants and daytime turbulence is smaller at longer wavelength. As a result, at daytime probability of detection stars in the FOV of the telescope is significantly higher in the SWIR band.

Figure 17:
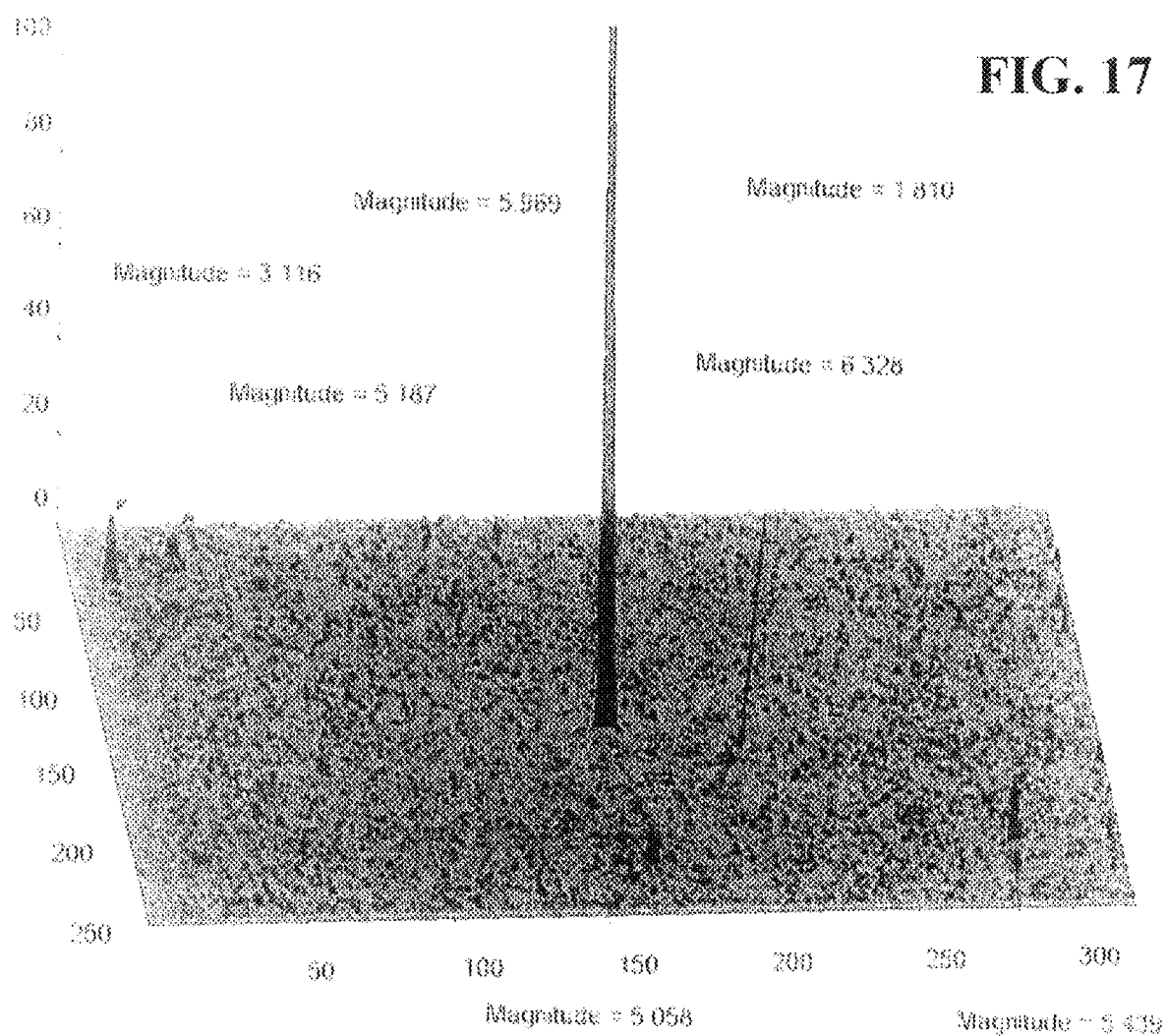
FIG. 17 is a three-dimensional representation showing a sky section and indicating a typical range of stars magnitude.

FIG. 1 shows the average number of stars in a FOV of 1 square degree vs star magnitude in the visible (V-band) and SWIR (H-band). It is seen that average number of stars in the H-band exceeds that number in the V-band by a factor of 10×. A $6^{th}$ magnitude limit in H-band provides more than 3 stars on average in the ACNS FOV, while this same number is only available at $9^{th}$ magnitude for a visible-band. FIG. 17 shows a processed daytime image of the sky recorded using 8" telescope with FOV of 0.5°×0.4° and a SWIR sensor at an angular distance from the sun of 100°. Seven stars are detected in the FOV of the telescope. The H-band star limiting magnitude is 63.

At night, a visible-band sensor detects dim GPS satellites (in a range 10-12 visible-magnitude) using a 500 msec exposures, whereas a SWIR sensor detects stars using a 15 msec exposures. Because two camera shutters are independently optimized for imaging stars (15 msec exposure) and satellites (500 msec exposure) and since HP-ACNS is tracking the satellites, the satellites are recorded as point objects and the stars are recorded as extremely short streaks, thus increasing the accuracy of image centroid determination, geo-position accuracy and availability of celestial solutions.

Applicants' field tests using a 1" aperture diameter brassboard demonstrated a 13 m error in longitude and −16 m in latitude based on the data collected using single LEO satellite over 4 minutes. Applicants' simulation modeling predictions demonstrate geo-position in 6 hours without GPS to within 5 m daytime and 20 m nighttime and with a guaranteed position of 25 m daytime and 50 m nighttime (FIG. 20) A low-cost, proven (TRL-9), gyro-stabilized four-axis pointing platform from IJK Controls LLC with offices in South Pasadena, Calif. (IJK) is capable of compensating ship movement at the highest sea states and will provide a stable platform at a much lower production cost than traditional marinized gimbals. The dual-band optical system and the pointing platform will use USA-made COTS components.

A second option is a 4-axis Toplite gimbal from Rafael. It has dimensions of H×Dia: 662 mm×406 mm, slew rate up 90°/sec, field of regard in azimuth 360 continuous or ±165° and elevation: −40° to +85° relative to turret base, LOS stabilization: better (less) than 25 μrad on a maneuvering helicopter in flight. The Toplite gimbal is mature and proven technology. It has been fielded in more than 20 countries and installed on 50 Navy ships.

Applicants' HP-ACNS

Embodiments of Applicant's High Precision-Automated Celestial Navigation System (HP-ACNS) is a passive optical navigation system in GPS denied environments designed for ship-based applications. The system determines ship geo-position continuously based on time-stamped angular position measurements of satellites and near-by stars. It employs a form of the Applicants' Angles-Only Navigation (AON) method, which was invented and first field demonstrated by Applicants in 2013. By using stars detected along the satellite track, the system determines accurate telescope pointing direction independent of the accuracy of the gyro-stabilized pointing mount. Because LOE, MOE and GPS satellites, as opposed to stars, are located at finite distances and their ephemerides can be accurately known, Applicants' HP-ACNS determines ship geo-position using generalized triangulation and does not require knowledge of the local vertical or gravity vector on a moving ship to determine the geo-position.

Applicants' HP-ACNS consists of two sub-systems:
(1) an above-deck Optical System, which includes a 6" diameter sheared-aperture telescope and a dual band camera system mounted on a marinized 4-axis gyro-stabilized pointing mount, and
(2) a below-deck Processing Unit, which is co-located with a GPNTS.

The Optical System includes a local IMU (Model KVH 1775, available from KVH Industries with offices in Anchorage Ak.) mounted on a telescope assembly, a sheared-aperture telescope and two cameras (visible-band and SWIR). The Optical System is designed to detect satellites and stars down to visual magnitude 5 at daytime and down to visual magnitude of 12 at night.

The dual-band Optical System allows simultaneous detection and tracking of satellites and stars both at daytime and at night. Using two cameras with different shutter rates, both satellites and star images are recorded as point objects, or extremely short streaks, and provide data with high signal-to-noise ratios (SNRs). At daytime, the cameras exposure times used for imaging stars and satellites differ by a factor of 66× and they differ by a factor of 33× at night. This greatly increases measurement accuracy of the satellite and stars positions on the focal plane array (FPA) and resulting geo-position accuracy. In addition, simultaneous rather than sequential measurements of satellites and stars avoid any source of error associated with the IMU (or INS) drift between separate measurements.

As confirmed by numerical simulation data some of which has been plotted in FIG. 20, Applicants' system can determine the geo-position to within 20 meters for daytime and 100 meters for nighttime less than 10 minutes after the system is turned on for 2.5 km ship initial position error. The position accuracy improves continuously and in about 6 hours, the error converges to less than 5 m for daytime LEO satellite observations, and to less than 20 m for higher orbit MEO and GPS satellites at night.

In preferred embodiments the Optical System also includes a wide-field All-Sky Monitor which, by detecting clear line-of-sight (LOS) to visible stars under partial-overcast conditions, aids in the pointing of the telescope. It provides an effective way of using the HP-ACNS for greater availability and higher update rate. The optical system is connected to HP-ACNS below-deck Processing Unit via tactical fiber cable. The optical system is lightweight (<100 lbs.) and fits within a ½-meter cube.

System Diagram and Description

Preferred embodiments of the present invention provide a high-precision, geo-positioning measurement device for surface ships, while minimizing size and weight, increasing update rate and availability and reducing development, procurement and maintenance costs. Applicants approach is based on a detailed trade-off analysis, which includes key parameters that affect system performance. These trade-offs include brightness and availability of satellites and stars, satellite angular rate, sky brightness, image quality of the telescope, radiometric SNR calculations, ship movement at various sea states and size weight and power (SWaP) of the system. Embodiments include a single 6" diameter Catadioptric telescope with 40 mm dichroic beam splitter cube optically shared by two cameras (visible-band and SWIR).

The telescope is mounted on a four-axis gyro-stabilized pointing mount designed to compensate for ship motion at high-sea states. The SWIR camera is optimized for imaging of stars during daytime, whereas the visible-band camera is optimised for observation of dim MEO satellites as well as GPS satellites during the "midnight hole," when LEO satellites are in Earth's shadow. Additionally, shift-and-add technique on focal plane arrays (FPAs) can be utilized to increase radiometric SNR.

Figures 2, 4:
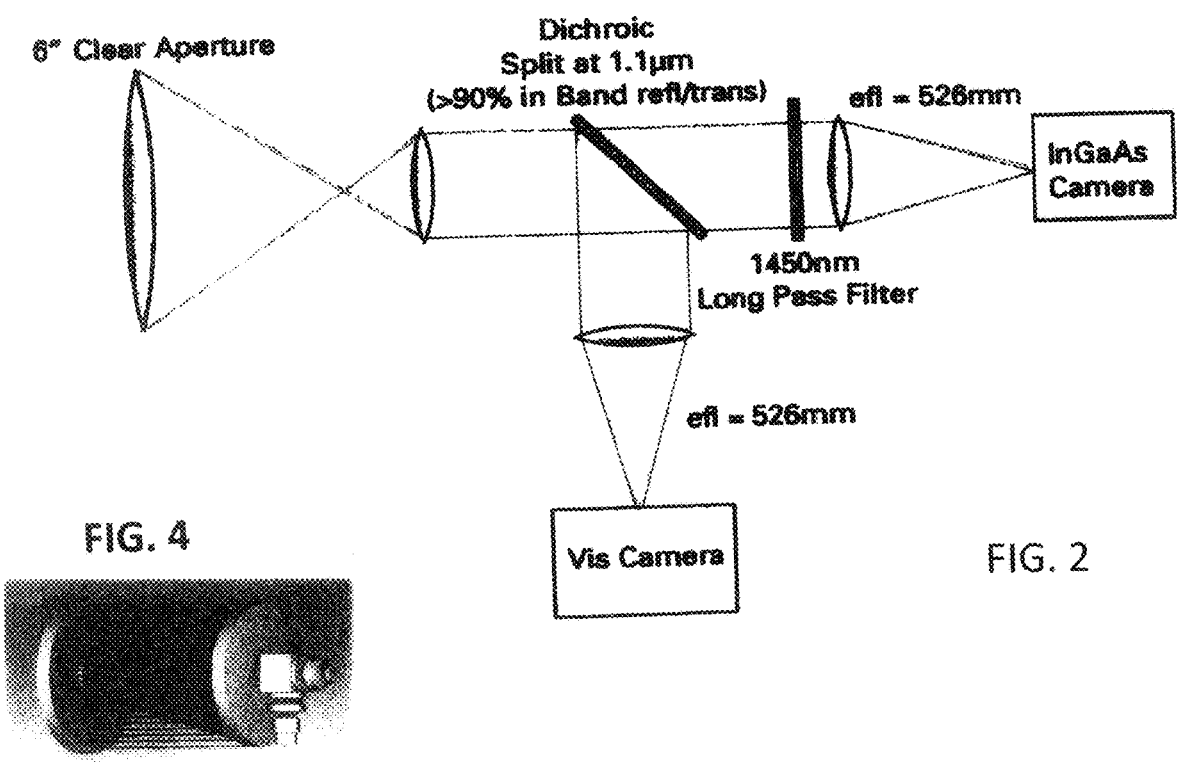
FIG. 2 is an example of a daytime SWIR image of the sky with a FOV of 0.5 degrees×0.4 degrees showing a variety of magnitude stars.
FIG. 4 is a drawing of components of a preferred dual band telescope that is a major component of embodiments of the present invention.

The basic concept for a combined visible/SWIR optical system is illustrated in FIG. 2. A dual-band optical design is shown in FIG. 4. It includes a 6" clear aperture Catadioptric Telescope with 40 mm dichroic beam splitter cube to separate the incoming visible/SWIR signal from the satellites and stars, which is then be detected by:

1) a 1080 pixel CMOS visible sensor with a 6.5 µm-pixel pitch providing 60 fps (Part. No. QI-SCMOS-RS available from Quantum Imaging with offices in Colorado Springs, Colo.) and
2) a 1-Megapixel InGaAs sensor with 10 µm pixel pitch, providing 60 fps (Part no. QI-SWIR-HD10 available from Quantum Imaging with offices in Colorado Springs, Colo.).

All the optical components can be easily fabricated, and the sensors are COTS cameras qualified for operation in a Mil-spec environment. An alignment of two sensors is maintained by imaging stars within the shared telescope field-of-view (FOV).

The relevant parameters and other details of the optics and cameras are listed in Table 2 below.

TABLE 2

Top level optics parameters
Table 2. Environmental and system parameters used in visible-band radiometry analysis

Figure 16A:
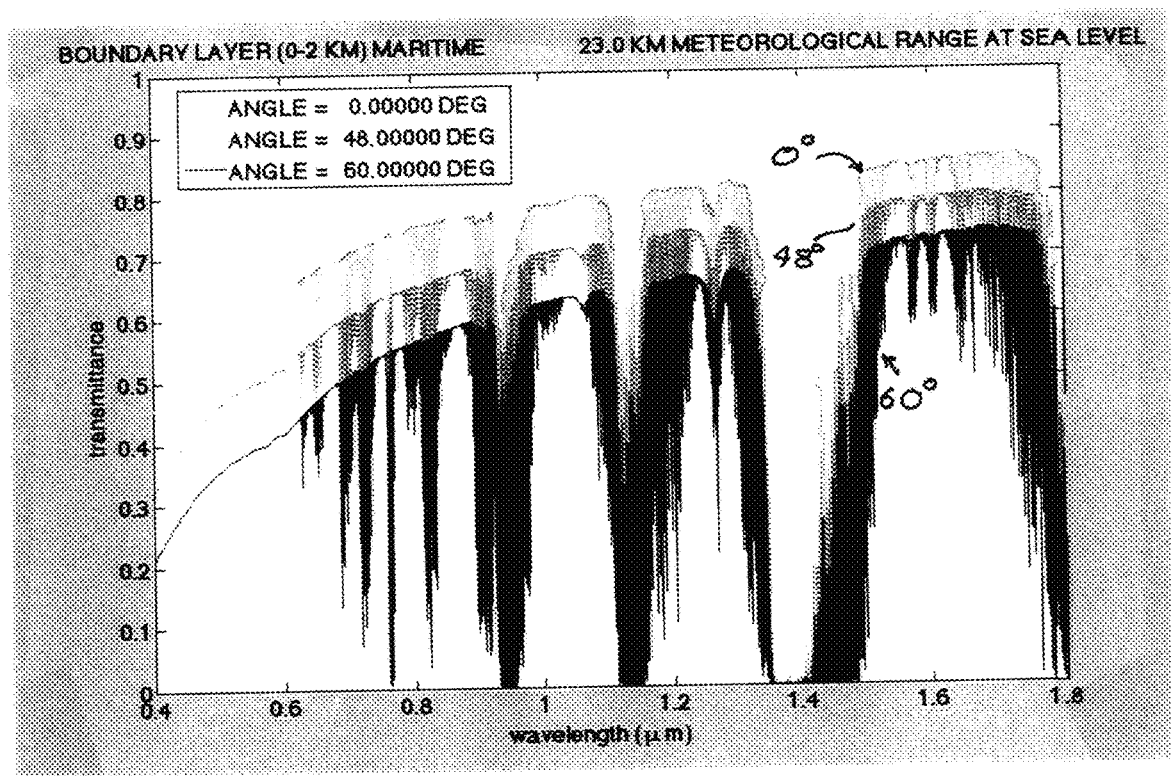
FIG. 16A shows transmittance for a preferred embodiment.
Figure 16B:
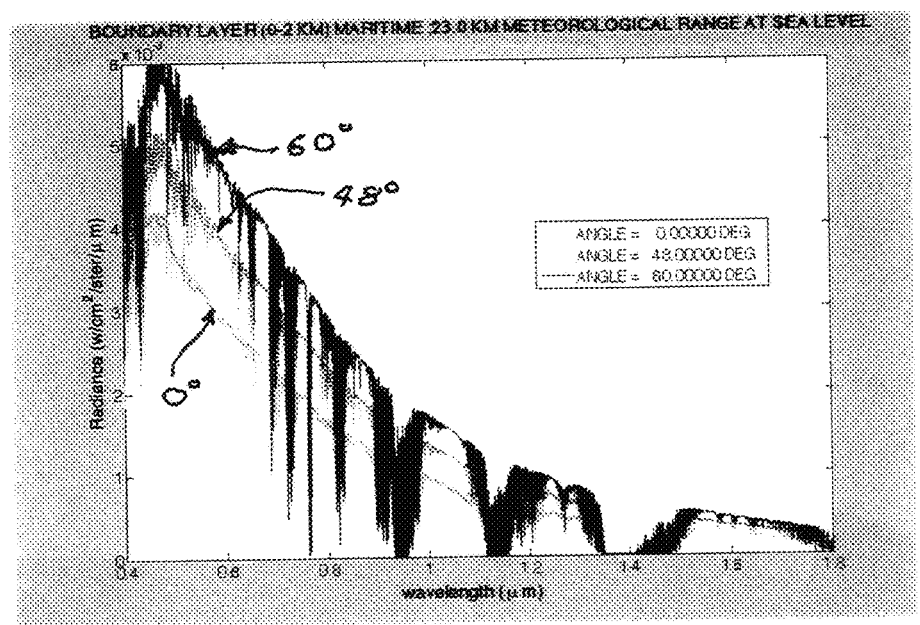
FIG. 16B shows background sky irradiance for a preferred embodiment.

| Quantity | Day | Terminator | Night | Comments |
|---|---|---|---|---|
| Illumination Properties | | | | |
| Spectral Band (µm) | 0.43-0.83 | 0.43-0.83 | 0.43-0.83 | Low noise NRI enhanced CMOS |
| Spectral Radiance of Sky Background | See FIG. 16 | N/A | N/A | |
| Star and satellite Flux | V band mag = 5 | V band mag = 7 | V band mag = 12 | Satellite flux spectrum same as 5900K |
| Star and satellite Density (stars/FOV) | 0.04 | 0.36 | 8 | Based on uniformal distribution |
| Resident Space Object Angular Rate (deg/sec) | 0.2 | 0.07 | <0.015 | |
| Optical System Properties | | | | |
| Clear Aperture Diameter (cm) | 15 | 15 | 15 | |
| Effective Focal Length (EFL) (mm) | 526 | 526 | 526 | |
| F/# | 3.5 | 3.5 | 3.5 | |
| Full Field of View (FFOV) (h × v) | 1.4° × 0.76° | 1.4° × 0.76° | 1.4° × 0.76° | |
| Instantaneous Field of View (µrad) | 12.4 | 12.4 | 12.4 | |
| System Optical Transmission | 0.9 | 0.9 | 0.9 | |

TABLE 2-continued

Top level optics parameters
Table 2. Environmental and system parameters used in visible-band radiometry analysis

| Quantity | Day | Terminator | Night | Comments |
|---|---|---|---|---|
| System Properties | | | | |
| Pixel Pitch (μm) | 6.5 | 6.5 | 6.5 | |
| Focal Plane Size (L × W in mm) | 12.48 × 7.02 | 12.48 × 7.02 | 12.48 × 7.02 | |
| Number of Total Pixels | 2M | 2M | 2M | |
| Frame Rate (fps) | 60 | 60 | 60 | |
| Quantum Efficiency | 0.7 | 0.7 | 0.7 | |
| Full Well (e/pixel) | 25,000 | 10,000 | 10,000 | Low gain day, hi gain night otherwise |
| Read Noise (e/pixel) | 20 | 2 | 2 | |
| Dark Current e/pixel/sec@20 C. | <25 | <25 | <25 | |
| Pixel Response Non-Uniformity | 0.05% | 0.10% | 0.10% | After correction |
| System and Other Properties of Interest | | | | |
| Exposure Time (msec) | 0.5 | 22 | 500 | |
| Peak Pixel SNR (Single Frame) | 6 | 20 | 90 | Average for 4 brightest pixels |
| System SNR using any multi-frame processing techniques | 14 | 20 | 90 | Day uses 8 frames, other modes single frames |

Relevant environmental and system parameters used in estimation of the system performance including radiometry and error budget analysis that are listed in Tables 3 and 4.

TABLE 3

Environmental and system parameters used in visible-band radiometry analysis

| Quantity | Day | Terminator | Night | Comments |
|---|---|---|---|---|
| Illumination Properties | | | | |
| Spectral Band (μm) | 0.43-0.83 | 0.43-0.83 | 0.43-0.83 | Low noise NRI enhanced CMOS |
| Spectral Radiance of Sky Background | See FIG. 16 | N/A | N/A | |
| Star and satellite Flux | V band mag = 5 | V band mag = 7 | V band mag = 12 | Satellite flux spectrum same as 5900K |
| Star and satellite Density (stars/FOV) | 0.04 | 0.36 | 8 | Based on uniformal distribution |
| Resident Space Object Angular Rate (deg/sec) | 0.2 | 0.07 | <0.015 | |
| Optical System Properties | | | | |
| Clear Aperture Diameter (cm) | 15 | 15 | 15 | |
| Effective Focal Length (EFL) (mm) | 526 | 526 | 526 | |
| F/# | 3.5 | 3.5 | 3.5 | |
| Full Field of View (FFOV) (h × v) | 1.4° × 0.76° | 1.4° × 0.76° | 1.4° × 0.76° | |
| Instantaneous Field of View (μrad) | 12.4 | 12.4 | 12.4 | |
| System Optical Transmission | 0.9 | 0.9 | 0.9 | |

TABLE 3-continued

Environmental and system parameters used in visible-band radiometry analysis

| Quantity | Day | Terminator | Night | Comments |
|---|---|---|---|---|
| System Properties | | | | |
| Pixel Pitch (µm) | 6.5 | 6.5 | 6.5 | |
| Focal Plane Size (L × W in mm) | 12.48 × 7.02 | 12.48 × 7.02 | 12.48 × 7.02 | |
| Number of Total Pixels | 2M | 2M | 2M | |
| Frame Rate (fps) | 60 | 60 | 60 | |
| Quantum Efficiency | 0.7 | 0.7 | 0.7 | |
| Full Well (e/pixel) | 25,000 | 10,000 | 10,000 | Low gain day, hi gain night otherwise |
| Read Noise (e/pixel) | 20 | 2 | 2 | |
| Dark Current e/pixel/sec@20 C. | <25 | <25 | <25 | |
| Pixel Response Non-Uniformity | 0.05% | 0.10% | 0.10% | After correction |
| System and Other Properties of Interest | | | | |
| Exposure Time (msec) | 0.5 | 22 | 500 | |
| Peak Pixel SNR (Single Frame) | 6 | 20 | 90 | Average for 4 brightest pixels |
| System SNR using any multi-frame processing techniques | 14 | 20 | 90 | Day uses 8 frames, other modes single frames |

TABLE 4

Environmental and system parameters used in SWIR radiometry analysis

| Quantity | Day | Terminator | Night | Comments |
|---|---|---|---|---|
| Illumination Properties | | | | |
| Spectral Band (µm) | 1.45-1.7 | 1.45-1.7 | 1.45-1.7 | InGaAS with 1.45 µm LP filter |
| Spectral Radiance of Sky Background | See FIG. 16 | N/A | N/A | |
| Star and RSO Flux | H band mad = 5 | H band mag = 7 | H band = 6.5 | Only stars detected at night |
| Star and RSO Density | 0.5 star/FOV | 9.5 stars/FOV | 5.7 stars/FOV | Based on uniform distribution |
| RSO Angular Rate (deg/sec) | 0.2 | 0.07 | <0.015 | |
| Optical System Properties | | | | |
| Clear Aperture Diameter (cm) | 15 | 15 | 15 | |
| Effective Focal Length (EFL) (mm) | 526 | 526 | 526 | |
| F/# | 3.5 | 3.5 | 3.5 | |
| Full Field of View (h × v) | 1.4° × 1.1° | 1.4° × 1.1° | 1.4° × 1.1° | |
| EFOV (µrad) | 19 | 19 | 19 | |
| System Optical Transmission | 0.9 | 0.9 | 0.9 | |
| System Properties | | | | |
| Pixel Pitch (µm) | 10 | 10 | 10 | |
| Focal Plane Size (L × W in mm) | 12.8 × 10.2 | 12.8 × 10.2 | 12.8 × 10.2 | |
| Number of Total Pixels (Mpixel) | 1.3 | 1.3 | 1.3 | |
| Frame Rate (fps) | 60 | 60 | 60 | |
| Quantum Efficiency | 0.85 | 0.85 | 0.85 | |

TABLE 4-continued

Environmental and system parameters used in SWIR radiometry analysis

| Quantity | Day | Terminator | Night | Comments |
|---|---|---|---|---|
| Full Well (e/pixel) | 800,000 | 10,000 | 10,000 | Mid gain day, high gain otherwise |
| Read Noise (e/pixel) | 400 | 40 | 40 | |
| Dark Current (e/ms) | 16 | 16 | 16 | |
| Pixel Non-Uniformity (%) | 0.02 | 0.10 | 0.10 | Pixel uniformity after correction |
| System and Other Properties of Interest | | | | |
| Exposure Time (msec) | 15 | 22 | 15 | |
| Peak Pixel SNR (Single Frame) | 9.9 | 12 | 14 | Average SNR for 4 brightest pixels |
| System SNR using multi-frame processing | 17 | 12 | 14 | Day use 4 frames, other two single frames |

A summary of key advantages of the HP-ACNS design architecture is included in Table 5.

TABLE 5

Key advantages of HP-ACNS design

| Implementation | Advantages |
|---|---|
| Dual Band | Optimized daytime operation<br>Optimized nighttime operation<br>High accuracy 24/7<br>High availability |
| Visible Sensor (CMOS)<br>Low read noise (<2e)<br>Optimized for imaging dim objects such as MEO and GPS satellites at night | 15-20x better than SWIR sensor noise capabilities<br>V-band limited magnitude 12 at night<br>Compact Optics<br>6" telescope = ½ meter cube<br>Long (500 msec) exposure at night using Fast Steering Mirror |
| SWIR Sensor<br>Large full well (800,000 e/pixel)<br>Optimized for daytime imaging | Best daytime performance<br>Low daytime sky background (factor of 8x lower compared to visible band)<br>Large number of IR stars (factor of 10x larger compared to visible band)<br>Large full well capacity (by a factor of 32 larger than that in visible band) |
| Simultaneous measurements of satellites and stars<br>Independent shuttering using two camera shutters with different rates | Sharp images<br>Image streak from relative motion minimized<br>Exposure times Visible/SWIR<br>0.5 msec/33 msec at daytime<br>500 msec/15 msec at night<br>Measurement independent of electromechanical feedback<br>EMU drifts, encoders |
| Large Field of Regard (FOR)<br>360° in azimuth<br>90° in elevation | Increased satellite and star availability<br>Increased update rate<br>Increased utility |
| Wide field All-Sky Monitor<br>Point to clear sky with RSO | Increases update rate in partly-obscured sky<br>Increased utility |
| Reduced SWaP<br>Small size<br>Below deck flexibility | Lower cost<br>Increased utility |

Opto-Mechanical Design

The optical system provides two star and satellite images via a shared-aperture telescope with dual beam paths after the primary focus: one path is in the visible light path and the other is in short wave infrared light path. Preliminary design and analysis show that the simplest, most cost-effective design is a modest reflective telescope combined with simple refractive objective lenses and a dichroic beam splitter.

Key requirements are: i) Large aperture; ii) Modest system size; Low system cost, and iv) Ease of integration and testing. To address these requirements, three system architectures were considered:

1. Off-axis, three mirror afocal telescope combined with refractive objective lenses
2. Single, larger aperture achromatic refractive lens telescope
3. Catadioptric reflective telescope The key deciding criteria in selecting the Catadioptric design were alignment complexity and cost. Given the on-axis nature of the Catadioptric design, the simplicity of using infinite conjugates, the presence of collimated light in the optical train, and the modest size of the refractive lenses, this system is the easiest to align and produce. A dual-band Catadioptric Telescope with 40 mm Dichroic Beam splitter Cube is shown in FIG. 4 The overall design parameters are listed in Table 2.

Electronic Design

The electronics of preferred embodiments are divided into four basic sub-systems: i) Mount control and drive electronics; Sensor interface and control for the SWIR/visible sensors; iii) above-deck to below-deck communications; and iv) the optical system of the PNT interface and processing unit. Where possible, off-the-shelf mil standard and previously qualified Navy components and subassemblies are used. To minimize added SWaP, the processing unit and ACNS-to-GPNTS interface are located below deck and can be mounted in Raytheon's GPNTS compact PCI card cage. The main processor interface will be consistent with the current GPNTS processing board and interface boards.

The below-deck electronics communicate with the above-deck NTS through a tactical fiber cable per MIL-PRF- 85045. The data protocol is standard 10 Gig Ethernet. Although it is conceivable to implement layer 2 or layer 3 encryption of these signals, given the point-to-point nature of the link and the lack of EMI emissions from optical fiber, this link is inherently secure and data encryption is not being considered for this program.

Mount Control and Drive Electronics

The mount control and drive electronics are integrated into the stabilized mount. The control board directly reads all four Renishaw encoders and commands an electrical "go-to" angle and desired current to the motor drives. It reads line-of-sight rate data from the on-mount IMU, calculates the drive current to the three-phase motor and implements a custom developed field-oriented control (FOC) algorithm. This architecture is better than the typical industry standard configurations where the motor drivers commutate directly from the encoders; Instead "commutation" is calculated by the main processor which sends the appropriate electrical angle to the Motor drive. This architecture has the advantage that the encoders can be read with lower latency and thus higher instantaneous accuracy.

Sensor Interface and Control Board for SWIR and Visible Sensors

Within the sensor package, the outputs of the SWIR and visible sensors are formatted into a standard data stream using Ethernet protocol to transmit to the below deck processing unit. The other function the interface board accomplishes is image acquisition synchronization with the pulse per second and absolute time. To do this, the board uses navigation timing and position (NTP) measured offsets to generate local synchronization signals.

ACNS to GPNTS Interface

The optical system-to-GPNTS interface is via Ethernet across compact PCI cards. The pulse per second timing interface to a computer processing unit is handled along with the fiber connection to the above-deck electronics. The ACNS receives from GPNTS time, position, attitude, temperature, pressure and humidity. The updated ship position, covariance estimates, and measurement time are transferred from ACNS to GPNTS using a standard GigE interface already developed.

Algorithm Processing Electronics

All processing and Graphical User Interfaces (GUIs) are executed on a standard cPCI SBC that is military approved and qualified.

Application software is installed on a computer processing unit (CPU). The Ethernet and pulse per second interfaces needed to integrate with GPNTS, as well as single mode fibers for communications with the Above Deck Optical System are included below deck. The use of single mode fiber (MIL-PRF-85045/18C) is well known for shipboard applications and supports long distance cable runs with much higher reliability and resistance to electromagnetic interference (EMI) compared to copper. The ACNS software is open source, modular, and can be installed on various types of computing platforms; thus, the ACNS Processing Unit can either be a standalone ruggedized rackmount computer or a single board computer in a multi-slot backplane such as a typical Compact PCI card.

Gyro-Stabilized Pointing Mount Design

Preferred systems utilise a stabilized mount to point to and track the different targets required for Angles Only precision measurements. The Navy has expressed a desire to avoid the cost and complexities of a 'gimballed' solution. Applicants evaluated several different pointing and strap down schemes including azimuth only, azimuth plus steering mirror, fast steering mirrors, Risley prisms and a fixed multiple optics system. All of these alternative approaches resulted in a significant decrease in accuracies and/or utility of Automated Celestial Navigation Systems for ships.

To mitigate the costs associated with a traditional gimbal, Applicants are addressing several issues: unit cost, reliability, angular rate, and pointing stability and accuracy. By utilizing a sufficiently wide field-of-view (FOV) and by digitally stabilizing the images, the stabilization requirements for achieving precision pointing have been relaxed well beyond the expected achievable stabilization performance of a low-cost tracking mount solution. The unit pricing is very cost effective (~$250K in production), leveraging heavily its similarity to high-quantity production units with which it shares all major components. Operating cost is further reduced by both the advanced design and the knowledge base gained from COTS history. These pointing mounts have expected failure and service rates measured in years.

The gimbal for the Applicants prototype HP-ACNS will be one of two mounts, each of which combine high stabilization performance, environmental ruggedness, and a proven track record of fielded operation. For the first option the mechanical design, servo control electronics, and control software is inherited from IJK Controls' existing TRL-9 products and previous programs. The electronics and software foundation have been used in several rapid development stabilized mount programs. The mechanical design shares elements with IJK Controls' previous designs but will be modified and tailored to fit the geometry, payload, stabilization and pointing requirements of this application. For the second option, a Toplite gimbal from Rafael will be used. A Toplite gimbal is mature and proven technology. An optical payload that includes a dual-band Catadioptric Telescope is designed to fit into the Toplite ball. Rafael has offices in Haifa Israel.

Software

Software can be partitioned into three main categories: i) algorithms, ii) hardware control, and iii) shipboard communication. All software development is compliant with the Modular Open Systems Approach (MOSA). Software will be cross platform compatible and targeted to run in the identified potential cpu platforms. The software application includes the following modules: i) an image processing algorithm; pointing algorithm; iii) star and satellite catalogs; iv) navigation algorithm, v) Navigation Unscented Kalman Filter (UKF): vi) an all-sky monitor algorithm, vii) system control software, and viii) interfaces with pointing mount and GPNTS.

The data flow begins by first receiving the current estimated position and attitude from GPNTS over the standard multi-cast messages via GigE. The position and attitude are then used to determine the sun position in the local horizon frame. The sun elevation angle is used to determine if the illumination conditions correspond to day, terminator or night conditions. The star and satellite catalogs are selected based on location and illumination conditions. Satellite Orbital predictions are made to determine time and pointing angles corresponding to coincidence of detectable satellites and stars in the camera field of view.

This information is checked against a wide field all-sky monitor to verify that there is clear line-of-sight (LOS) to the desired satellite and stars within camera FOV. The process is repeated instantly until a LOS is found. Without the wide field monitor celestial objects would have to be individually moved to, and images would have to be acquired and processed before verifying a clear LOS. This would reduce the availability of celestial solutions and update rate. The pointing angles, satellite positions and velocities are transferred to the mount and the image processing module. This is done in the current local horizon frame. Based on the sky background estimate and measurements from the Wide Field All Sky Monitor, satellite velocity and time, the two cameras are triggered to acquire simultaneous images, although with different 'shutter' rate. After image acquisition, the image processing module produces measured relative star and satellite positions on the FPAs of the two sensors with time tags which are transferred to the navigation module.

Figure 5:
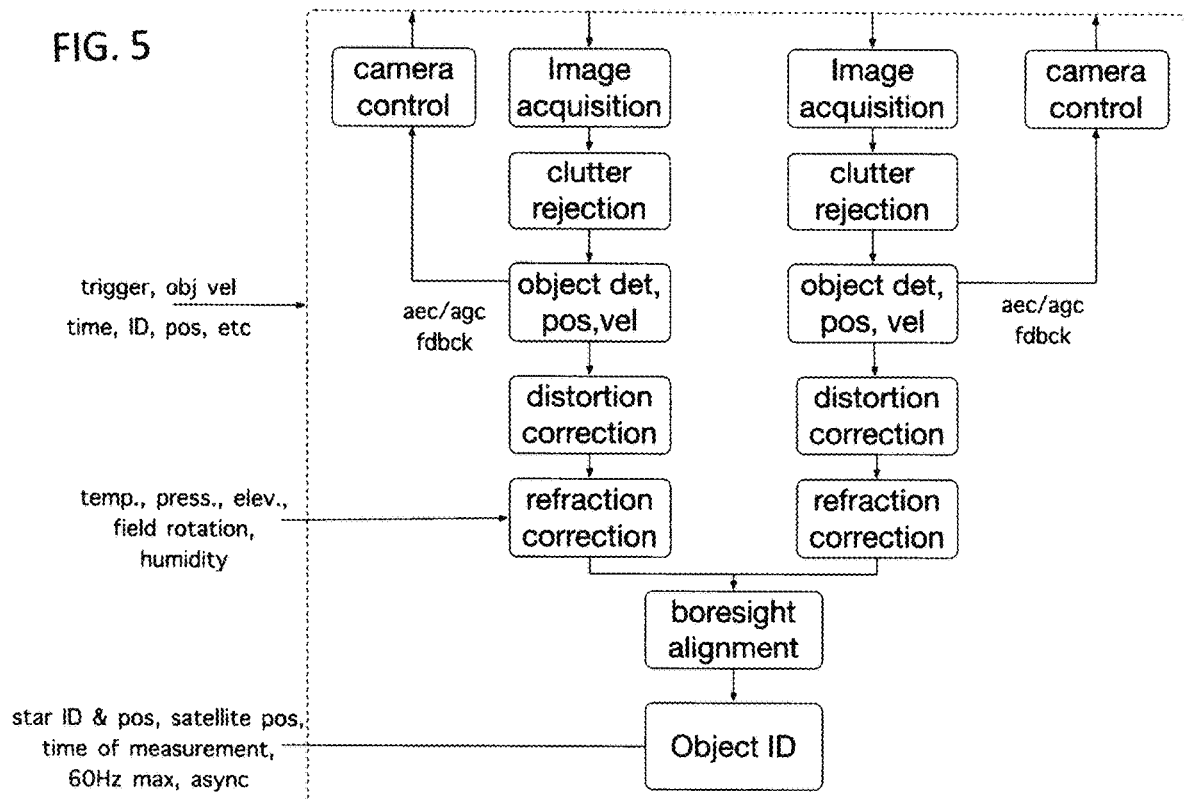
FIG. 5 is a flow diagram of a software concept for the present invention.

Preferred software concept is described in FIG. 5. The navigation algorithm updates the internal Unscented Kalman Filter (UKF) based on the measured satellite image location on FPA and time. The updated ship position and covariance estimates are transferred to GPNTS using a standard GigE interface already developed.

Figure 6:
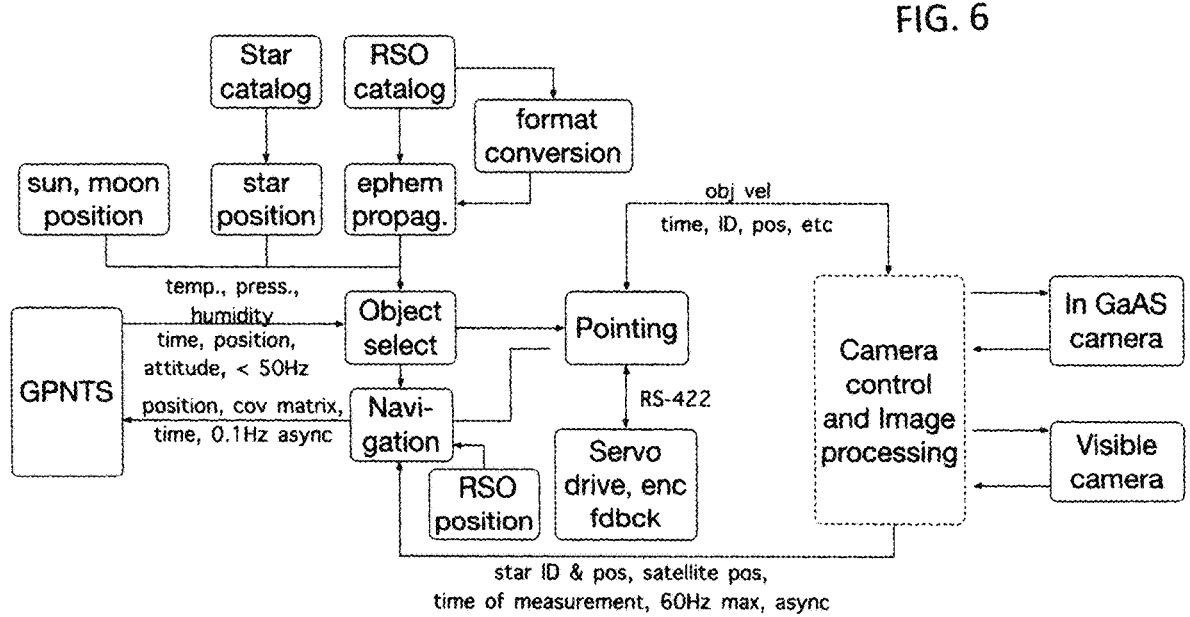
FIG. 6 shows preferred features of a camera control and image processing module

The image processing module is depicted in FIG. 6. There are corresponding blocks for each image to set the gain and exposure, reject clutter, and detect the stars and satellite in the images along with their relative position. Lens distortion, refraction, and boresight correction are required in order to achieve the required position accuracy and can be checked and calibrated for in real time based on the known star maps. When combined with the image acquisition time, the measurements provide the satellite position in the celestial sphere frame at a precise time.

The star catalog is based on the appropriate combination of the current USNO developed H-band catalog to $7^{th}$ magnitude and the USNO UCAC4 catalog modified to provide magnitudes matched to the telescope/camera spectral response, all convolved with a nominal sea-level atmospheric transmission. The satellite catalog is based on the government-provided satellite orbits. Additional orbit propagators will be updated as necessary to provide high accuracy orbital data for LEO satellites based on the real time measurements from the HP-ACNS, during high confidence shipboard INS periods. Orbital prediction for high accuracy GPS orbits will be implemented.

Operating Modes

The present invention provides continuous positioning information. Throughout the day multiple operating modes and satellite types/constellations are used.
Daytime operation using LEO satellites and stars
Sunset and Sunrise (terminator) using LEO and MEO (GNSS) satellites and stars
Nighttime, including 'Midnight Hole' using 'High LEO' (GlobalStar) and/or MEO (GNSS/GPS) satellites and stars.

The 100 brightest LEO objects are at visual magnitude 5.5 or brighter, and most are nominally grey. Globalstar satellites are on the order of $7^{th}$ to $8^{th}$ magnitude. (GlobalStar is a communications cluster orbiting around 1.5 million meters providing nearly continuously available observations for certain locations and time of the year.) GNSS/GPS satellites for all altitudes are illuminated throughout the night including midnight hole. They are of $10^{th}$ magnitude or dimmer yet remain observable with the visible camera in the preferred embodiment.

The Applicants' dual-band sensors take advantage of the spectral distribution of the satellites and stars. On average, satellites are blue (i.e. grey bodies illuminated with the spectrum of our sun) and thus best detected in the visible band, and on average stars are significantly redder than our sun and thus best detected at H band. Similarly, the number of stars in the FOV is greatly increased in the H band. FIG. 1 depicts the number of stars per square degree (the current design field is approximately 1 square degree) by H-band magnitude. The number of stars per square degree by H-band magnitude is illustrated. The results illustrate that a $6^{th}$ magnitude limit in H-band provides more than 3 stars on average in the FOV, while this same number is only available at $9^{th}$ magnitude for a visible-band The best detection of satellites is in the visible spectrum, while the H-band sensor can provide robust star detection and identification.

Radiometric Analysis

The following results give a performance of limiting magnitudes of $m_v=5$ for a solar illuminated grey body (satellite), and $m_H=3.7$ for stars in the SWIR FPA during the daytime. This covers the majority of the 100 brightest satellites and predicts an average number of 0.5 stars in the sensor FOV (or an average of 12 stars along a 40° satellite track). Visible limits to 7 at Terminator and provide GNSS ($m_v=10$-12) observation at Night (experimentally confirmed). As explained above, Table 1 gives a summary of operational performances.

Radiometry

Figure 10A:
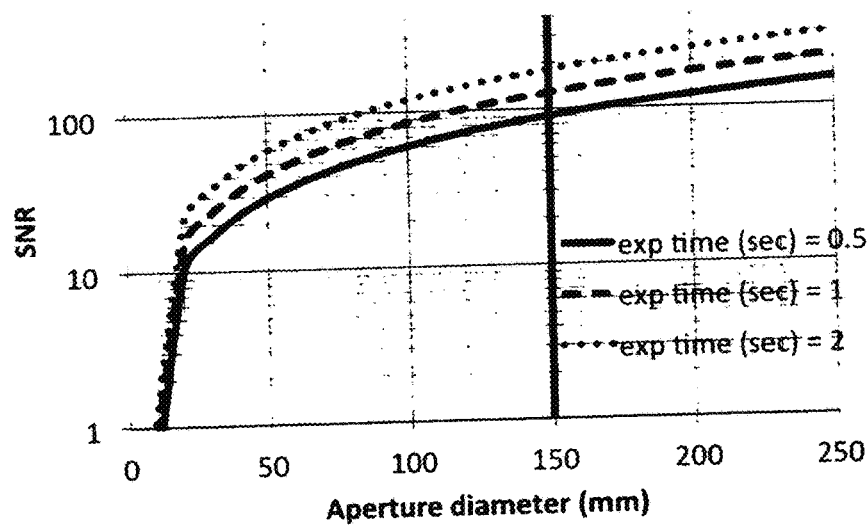
FIG. 10A shows the night radiometry results predicted for a GPS satellite from the infrared sensor with the sun at a 40-degree phase angle, with an aperture diameter of 150 mm indicated.
Figure 10B:
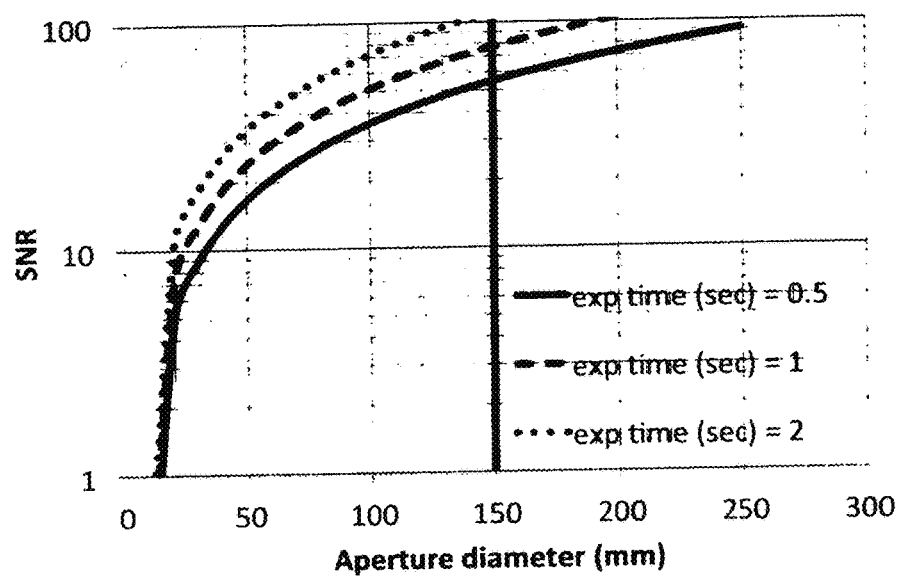
FIG. 10B shows the night radiometry results predicted for a GPS satellite from the visible light sensor with the sun at a 40-degree phase angle.
Figure 11A:
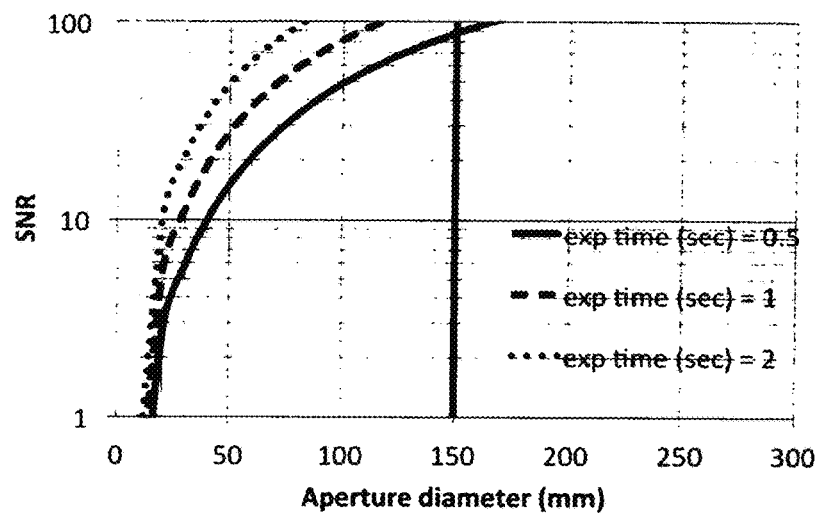
FIG. 11A shows the night radiometry results predicted for a GPS satellite from the InGaAs sensor and a long pass sensor with the sun at a 40-degree phase angle.
Figure 11B:
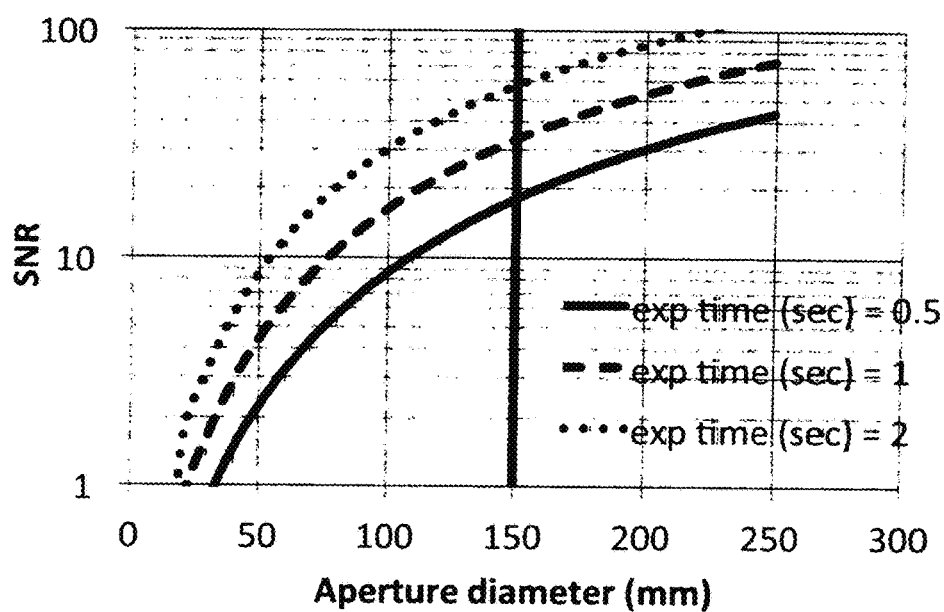
FIG. 11B shows the night radiometry results predicted for a GPS satellite from the visible light sensor and a long pass sensor with the sun at a 40-degree phase angle.

The night radiometry for the visible and SWIR sensors, is illustrated in FIGS. 10 and 11 for two different GPS satellite types. FIG. 10. (left) shows GPS Block II, 40° phase angle, visible sensor (NIR enhanced CMOS); and FIG. 10 (right) shows GPS Block IIR, 40° phase angle with visible sensor. FIG. 11 (left) shows GPS Block II, 40° phase angle, SWIR (InGaAs) sensor with 1.45 um long pass filter; and FIG. 11 (right) GPS Block IIR, 40° phase angle with 1.45 um long pass filter. These radiometric calculations were made using measurements of spectral energy distribution for GPS satellites made by Frederick J. Vrba, USNO OPTICAL BRIGHTNESS MEASUREMENTS OF GPS SATELLITES ON ORBIT, CMB 7 Nov. 2005. The atmospheric transmission is based on MODTRAN calculations for zenith observation, for a 23 km visibility, maritime aerosol model as viewed from sea level. The MODTRAN transmission and sky background calculations that are used to support the radiometry analysis (off-zenith observation, 23 km visibility, maritime aerosol model, sun zenith angle of 60°) are shown in FIG. 16. Additional atmospheric parameters, sensor quantum efficiency, and other relevant parameters are listed in Table 2.

LEO satellites are observed during terminator. Noise contribution from sky background is minimal and is ignored. The Calculated visible-light and SWIR SNRs corresponding to $6^{th}$ magnitude gray and 3500 K color-temperature objects (two spectral energy distributions) are illustrated in FIG. 12

Figure 13A:
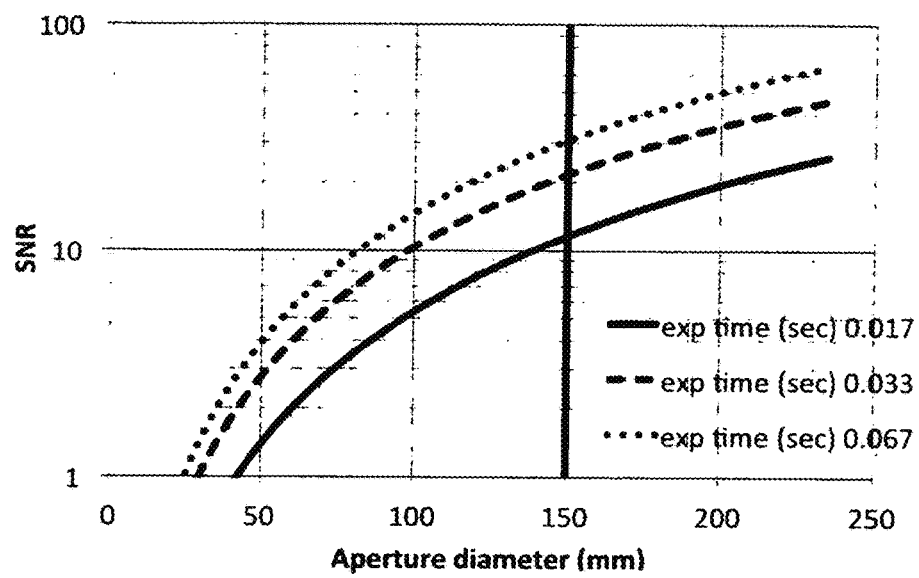
FIG. 13A shows a calculated SNR distribution during terminator for a 6th magnitude 3500 color-temperature object with a first energy distribution for similar to FIG. 12A but a different range of exposure times.
Figure 13B:
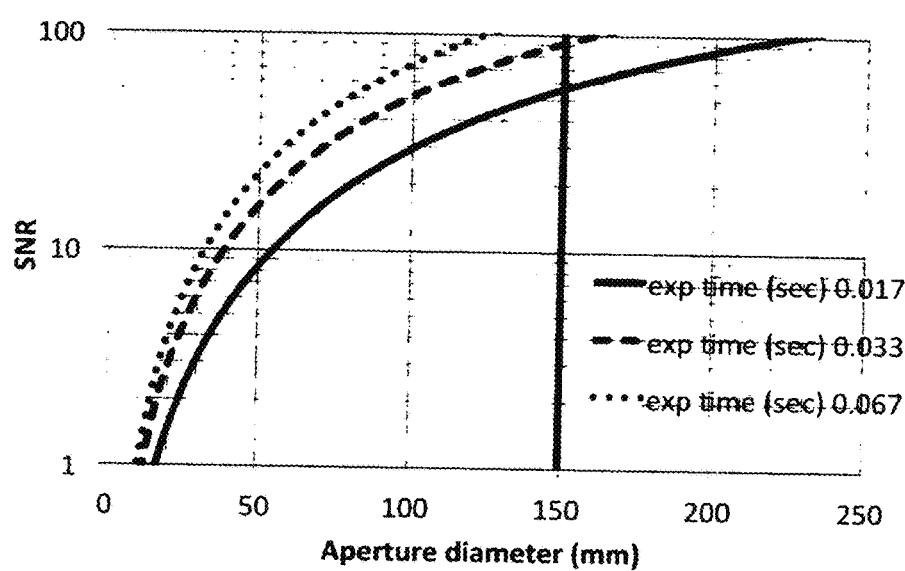
FIG. 13B shows a calculated SNR distribution during terminator for a 6th magnitude 3500 color-temperature object with a first energy distribution for similar to FIG. 12B but a different range of exposure times.

(visible) and FIG. 13 (SWIR) for a range of exposure times (22 msec, 44 msec, and 88 msec), corresponding to the total exposure time for 4, 8, and 16 frame integrations of 5.5 msec snapshots (which will freeze a satellite to less than one 19 μrad pixel given a typical LEO satellite angular rate of 0.2°/sec). Nominally all of the 100 brightest LEO satellites are visible with the unaided eye, at magnitude 5.5 or brighter. The SNR on the tracked object (currently the satellite) can be improved by integrating multiple frames, and a similar improvement can be made by appropriate shift-and-add summing of frames on the untracked object.

Figure 14A:
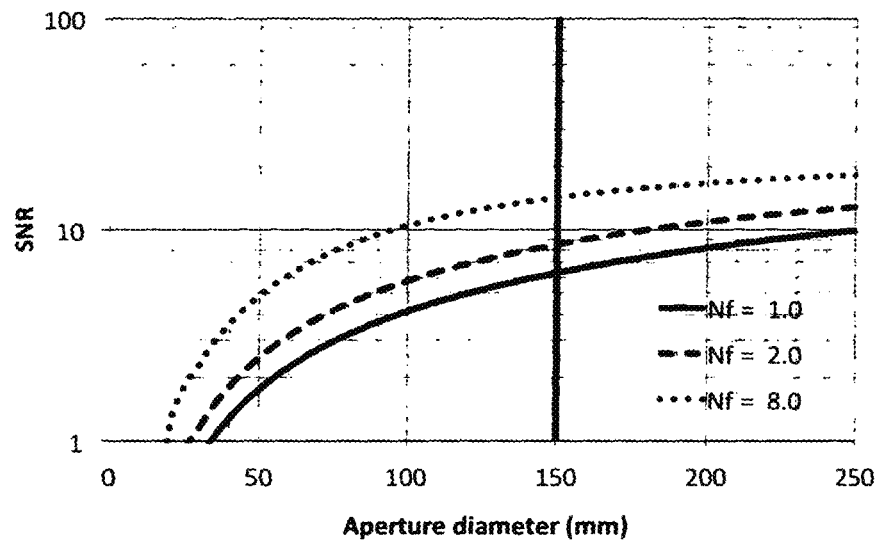
FIG. 14A shows results from a LEO satellite and using a CMOS visible sensor.
Figure 14B:
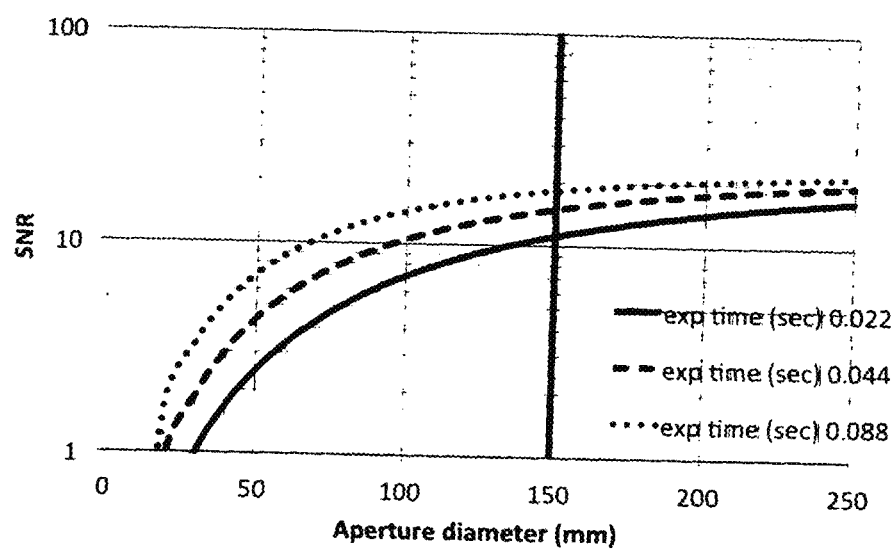
FIG. 14B shows similar results from the LEO satellite as in FIG. 14A but using a SWIR and along pass filter.
Figure 15:
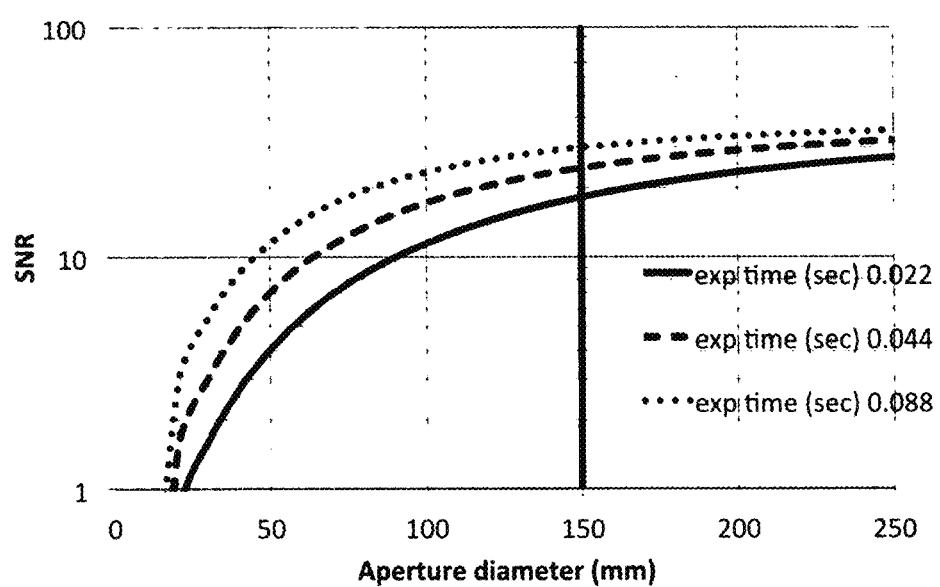
FIG. 15 shows some daytime radiometry at H-band at three separate exposures.

In the daytime, the calculated SNR for an $m_v=5$, solar-illuminated grey body is illustrated in FIG. 14 (left) as a function of aperture size. A detection threshold of SNR=10 is achieved with an 8 frame average (4 msec integrated exposure, 120 msec measurement time for the 60 fps camera). For the 15 cm clear aperture, the individual 0.5 msec exposures collect 23,000 photoelectrons per pixel per frame on the 12.3 urad CMOS pixels; close to full-well capacity. Beyond full-well saturation, aperture diameter dependence is reduced, since shorter exposure times would be required for larger apertures. All calculations are based on an average sky background of 2700 uW/cm²/ster/um over the 0.4 um to 0.8 um band. In comparison, SNR is calculated for the SWIR FPA in FIG. 14 (right), given the same object and viewing conditions. Radiometry for daytime star viewing at H-band is shown in FIG. 15.

Figure 12A:
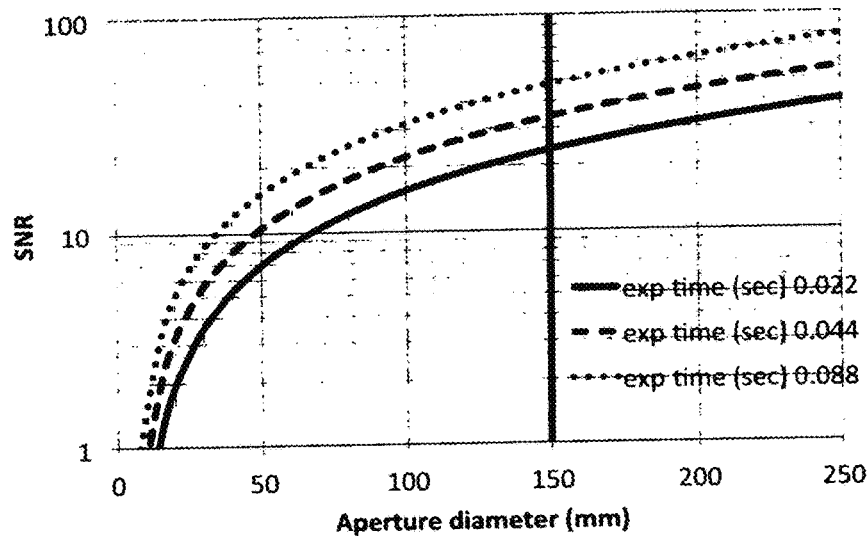
FIG. 12A shows a calculated SNR distribution for a 6th magnitude 3500 color-temperature object with a first energy distribution for a range of exposure times.
Figure 12B:
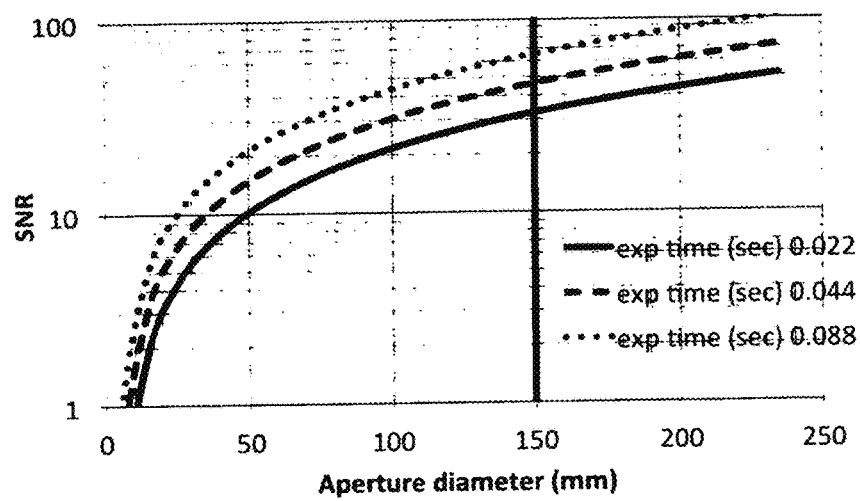
FIG. 12B shows a calculated SNR distribution during terminator for a 6th magnitude 3500 color-temperature object with a second energy distribution for a rage of exposure times.

FIG. 12. (left) represents a LEO object, grey, $m_v=6$, with visible sensor (NIR enhanced CMOS); (right) represents a LEO object, color temperature=3500 K, $m_v=6$, with visible sensor. Terminator radiometry. FIG. 13 (left) LEO object, gray, SWIR sensor $m_v=6$, with 1.45 um long pass filter; (right) LEO object, color temperature=3500K, SWIR $m_v=6$, 1.45 um long pass filter. Terminator radiometry. FIG. 14 (left) presents a LEO object, grey, $m_v=5$, daytime zenith observation, 23 km visibility maritime aerosol, 0.05% FPA non-uniformity after correction and different number of averaged frames on a CMOS visible-band sensor; and (right) represents the same object and conditions, SWIR sensor with 1.45 μm long-pass filter, 0.02% FPA non-uniformity after correction. Daytime radiometry. FIG. 16 (left) shows transmittance, and (right) background sky irradiance, for Applicants' radiometry model.

Expected Geo-Position Accuracy

Celestial based geo-position measurement error budgets, without Unscented Kalman Filter (UKF) gain, are listed in Tables 8, 9 and 10, corresponding to day, terminator, and night (midnight hole) observations. For each table, the required position error, highlighted in yellow, is scaled to an equivalent angular measurement error, also highlighted in yellow, based on the nominal range.

The main contributors to the day budget (Table 7) are uncorrected optics distortion (0.05% required), timing errors, field rotation about the line of sight (LOS), satellite catalog error, and atmospheric turbulence LOS variations. During the day, since only a single star shares the field with the satellite, field rotation about the optical axis is determined by the shipboard INS after a transfer alignment from ship INS WSN 7 to the HP-ACNS Optical system. This limits rotation accuracy to be on the order of 1 mrad. Satellite ephemeris accuracy is included. The satellite cross-track error is noted here, with the assumption that 5 measurements are required to achieve the required performance, observations will be made on different satellites traveling in different directions. The UKF gain will optimally weight the multiple observations, ensuring that the cross track measurements will provide the major contribution, and observing multiple objects moving in different directions will provide a roughly equal error in all directions.

During terminator, the main errors are similar to daylight measurements, with the exception of some improvements. The available satellites at increased range tighten the angular accuracy requirement; this is offset by the accuracy of field rotation measurement about the optical axis which can be more accurately measured based on multiple stars in the field, providing an improved measurement over the INS based approach. It is also expected that the strength of atmospheric turbulence will be reduced during night and terminator.

During nighttime, the error analysis assumes the only sunlit objects available will be in middle-earth orbits (MEO) or GPS orbits. The error budget illustrated here corresponds to observation of GPS satellites in semi-synchronous orbit. Their much larger range results in a much tighter angular measurement accuracy requirement. This is somewhat offset by the increased satellite position accuracy (about +/−1 m) available and the larger number of stars in the field as a result of the longer exposures required to detect the objects. In addition, 20 measurements will be combined to achieve the desired position accuracy.

TABLE 7

Open loop pointing budget (all values in degrees)

| | | |
|---|---|---|
| FOV | 1.10 | single axis (H-band horiz FOV) |
| acquisition factor | 0.25 | |
| Total | 0.28 | requirement |
| Initial position estimate | 0.09 | start position error 10 km |
| horiz pointing estimate | 0.11 | (2 mrad, mag compass w decl corr) |
| vert pointing estimate | 0.06 | (1 mrad avg accelerometer) |
| mount pointing uncertainty | 0.11 | (2 mrad after mount model correction) |
| transfer align accuracy | 0.11 | (2 mrad) |
| time deviation | 0.05 | (50 msec err, 1 deg/sec object) |
| Total (deg) | 0.22 | current estimate (horiz = worst axis) |

TABLE 8

Error budget for day measurements (all values in μrad unless otherwise noted)

| | | |
|---|---|---|
| RSO Range (km) | 500 | Day |
| Ephemeris Accuracy (m) | 10 | |
| Zenith angle (deg) | 45 | |
| Total (μrad) | 28.3 | requirement |
| Parameter | | single axis |
| Centroid noise (stars) | 1.90 | spot size, # of stars: 19, 1 |
| Centroid noise (sat) | 1.90 | |
| distortion (uncorr.) | 12.0 | HFOV (deg)/relative to field:1.38/2000 |
| field rotation | 9.5 | 1 mrad attitude, 500 pix sep |
| time error | 8.7 | 1 msec, 0.5 deg/sec slew |
| camera trigger | 8.7 | 1 msec |
| star catalog error | 2 | (incl unpredicable earth wobble) |
| RSO cat error | 20 | (10 m at 500 km) |
| center mass, solar scatter offset | 8 | (4 m at 500 km) |
| boresight coalign | 4 | |
| atmos turbulence | 14 | 5 cm seeing |
| # meas/satellite | 5 | |
| Total (μrad) | 14.7 | |

TABLE 9

Error budget for terminator measurements (all
values in μrad unless otherwise noted)

| | | |
|---|---|---|
| Sat Range (km) | 1500 | Late terminator |
| Ephemeris Accuracy (m) | 10 | |
| Zenith angle (deg) | 45 | |
| Total (urad) | 9.4 | requirement |
| Parameter | | single axis |
| Centroid noise (stars) | 1.34 | spot size, # of stars: 19, 2 |
| Centroid noise (RSO) | 1.90 | |
| distortion (uncorrected) | 12.0 | HFOV (deg)/relative to field:1.38/2000 |
| field rotation | 2.7 | 0.28 mrad attitude, 500 pix sep |
| time error | 3.5 | 1 msec, 0.2 deg/sec slew |
| camera trigger | 3.5 | 1 msec |
| star catalog error | 2 | incl unpredicable earth wobbl |
| RSO catalog error | 6.7 | 10 m at 1500 km |
| center mass, solar scatter offset | 2.7 | 4 m at 1500 km |
| boresight co-alignment | 4 | |
| atmospheric turbulence | 7 | 10 cm seeing |
| # measurements/satellite | 5 | |
| Total (μrad) | 7.8 | |
| Sat Range (km) | 20000 | Night |
| Ephemeris Accuracy (m) | 75 | |
| Zenith angle (deg) | 60 | |
| Total (urad) | 4.3 | requirement |
| Parameter | | single axis |
| Centroid noise (stars) | 0.95 | spot size, # of stars: 19, 4 |
| Centroid noise (RSO) | 1.90 | |
| distortion (uncorrected) | 12.0 | HFOV (deg)/relative to field:1.38/2000 |
| field rotation | 1.9 | 0.2 mrad attitude, 500 pix sep |
| time error | 1.4 | 10 msec, 0.008 deg/sec slew |
| camera trigger | 1.4 | 10 msec |
| star catalog error | 2 | incl unpredicable earth wobble |
| RSO catalog error | 0.1 | 1 m at 20000 km |
| center mass, solar scatter offset | 0.2 | 4 m at 20000 km |
| boresight co-alignment | 4 | |
| atmospheric turbulence | 7 | 10 cm seeing |
| # measurements per satellite | 20 | |
| Total (μrad) | 3.4 | |

TABLE 10

Error budget for night measurements
without UKF gain (μrad unless noted)

| | | |
|---|---|---|
| Sat Range (km) | 20000 | Night |
| Ephemeris Accuracy (m) | 75 | |
| Zenith angle (deg) | 60 | |
| Total (urad) | 4.3 | requirement |
| Parameter | | single axis |
| Centroid noise (stars) | 0.95 | spot size, # of stars: 19, 4 |
| Centroid noise (RSO) | 1.90 | |
| distortion (uncorrected) | 12.0 | HFOV (deg)/relative to field:1.38/2000 |
| field rotation | 1.9 | 0.2 mrad attitude, 500 pix sep |
| time error | 1.4 | 10 msec, 0.008 deg/sec slew |
| camera trigger | 1.4 | 10 msec |
| star catalog error | 2 | incl unpredicable earth wobble |
| RSO catalog error | 0.1 | 1 m at 20000 km |
| center mass, solar scatter offset | 0.2 | 4 m at 20000 km |
| boresight co-alignment | 4 | |
| atmospheric turbulence | 7 | 10 cm seeing |
| # measurements per satellite | 20 | |
| Total (μrad) | 3.4 | |

Availability and Frequency Parameterized by Operating Conditions

Availability of an AON geo-positioning solution depends directly upon the availability of satellites detectable by the HP-ACNS optical system. During the daytime there are on average approximately 0.66 LEO satellites at detectable brightness magnitude (~5.5) at any time throughout the day. During terminator there is approximately 1 LEO satellite detectable (magnitude<7.5), due to reduced sky background, and at night during the midnight hole there are about 15 MEO satellites detectable at much lower intensity in the visible light band. At mid-latitudes during the night there are also on average about 0.5 high-LEO satellites, for instance in the Global Star constellation, visible at magnitude 7-9 at all times for certain locations and time of the year.

Real World Data to Support Claims—Terminator and Nighttime Geo-Position Via AON

Figure 7:
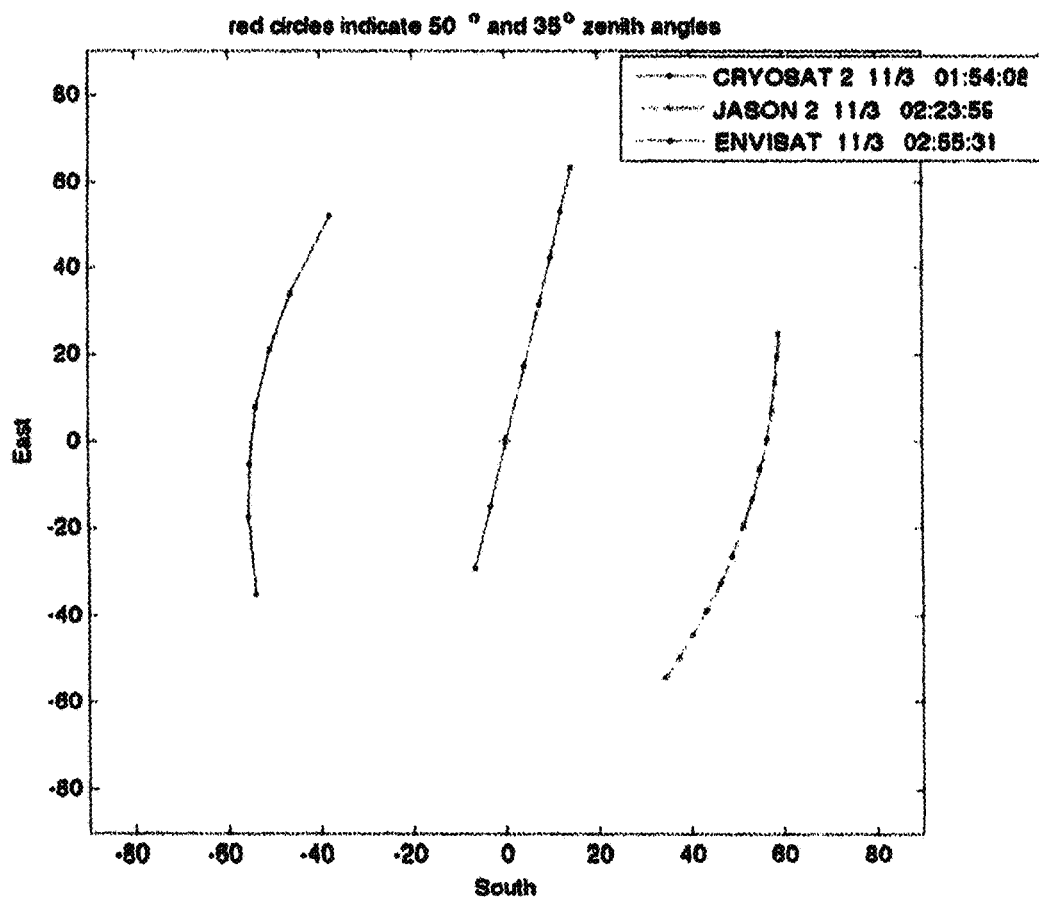
FIG. 7 is an example of observation geometry of a low earth orbit satellite.

Measurements of LEO satellites were performed during terminator using a celestial navigator brassboard with 1" diameter telescope. FIG. 7 shows observation geometry for LEO Cryosat-2 satellite on Nov. 3, 2018 (UTC) (red curve). The square root covariance for satellite ephemeris is less than 40 m in each of three axes. The satellite motion direction is from South to North. The brassboard used in data collection includes a 1" aperture diameter telescope with low-light NIR enhanced visible-band camera, 4°×8° FOV, 1280×720 pixels, 100 μrad IFOV, commercial computer-controlled gyro-stabilized gimbal and PC. The data was collected using step and stair technique. Eight celestial measurements were performed during single satellite pass over 4 minutes.

Table 11 shows statistics of position error in the full navigation solutions for Cryosat-2 satellite. The average longitude error is 13 m and average latitude error is −16 m.

TABLE 11

Statistics of errors in the full navigation solution
for Cryosat 2 satellite observed on Nov. 3, 2018

| | Offset from observer GPS location (m) | |
|---|---|---|
| file name | latitude | longitude |
| CRYOSAT 2 2018 11 3 01:54:06 01:54:22 | 7.0404 | 24.566 |
| CRYOSAT 2 2018 11 3 01:54:35 01:54:51 | 12.442 | 12.443 |
| CRYOSAT 2 2018 11 3 01:55:04 01:55:20 | 5.3613 | −35.565 |
| CRYOSAT 2 2018 11 3 01:55:33 01:55:49 | −25.877 | −6.5233 |
| CRYOSAT 2 2018 11 3 01:56:31 01:56:47 | 8.9549 | −2.6073 |
| CRYOSAT 2 2018 11 3 01:57:02 01:57:18 | −82.855 | −8.6688 |
| CRYOSAT 2 2018 11 3 01:57:31 01:57:47 | −110.01 | 3.3919 |
| CRYOSAT 2 2018 11 3 01:58:00 01:58:16 | 57.087 | 118.58 |
| Avg | −16 | 13 |

Figure 18:
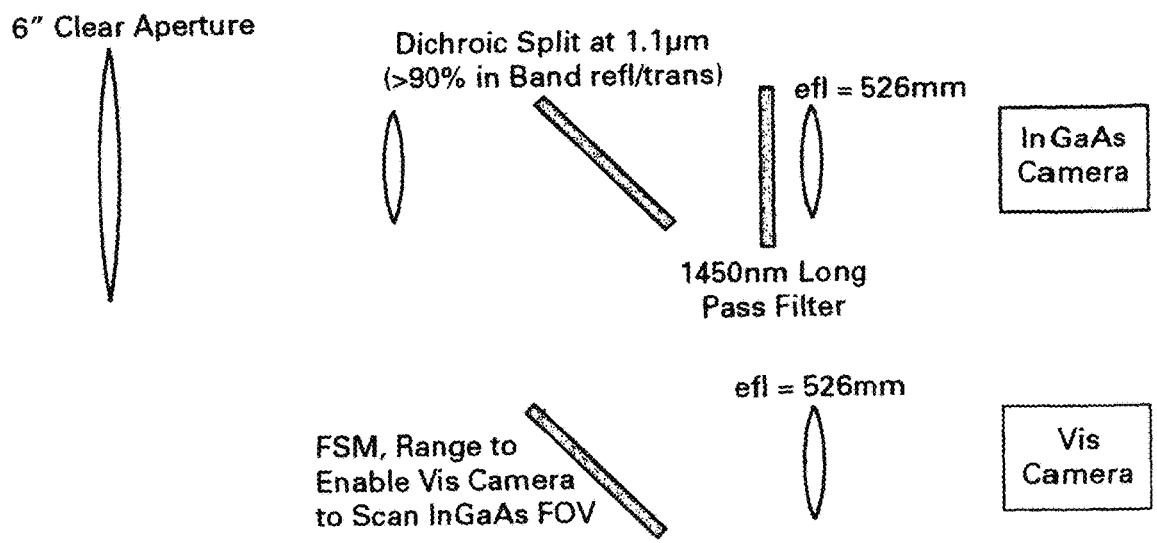
FIG. 18 is a preferred modification to the dual-band design that includes a fast steering mirror.

Applicants have also collected data on GPS satellites during the midnight hole, using only a 5" refractor telescope and CCD camera (see FIG. 18). This data has been processed to obtain a geo-positioning solution, achieving an accuracy (within timing error) of better than 60 meters.

Using a visible-band CCD camera and a 5" refractor telescope on an equatorial mount (FIG. 18), the image of GPS BIIRM-5 (PRN 29) (#32384), an active GPS satellite, was recorded at approximately 10:17 PM on Saturday, May 5, 2018. The satellite (top center of FIG. 8) shows up as a streak in the image, as its movement relative to the Earth, over the 2 second camera exposure time, differs from that of the celestial sphere.

Figure 8:
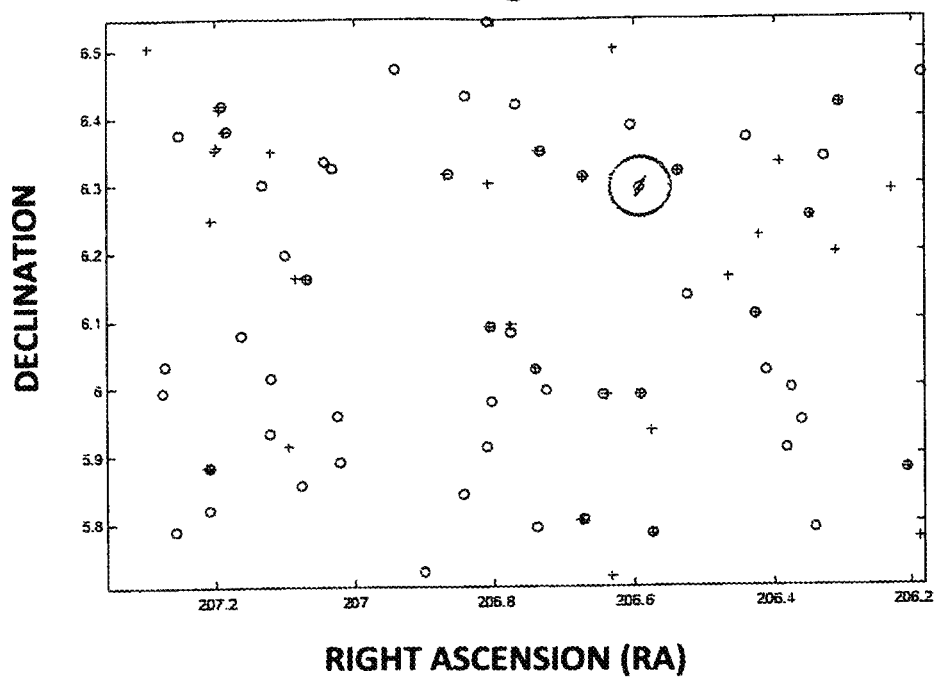
FIG. 8 shows right ascension (RA) and declension coordinates of an image identified with a star fit file with a satellite location circled.

Using an Image Link plate solver, the right ascension (RA) and declination (dec) coordinates of the camera image are identified, with the star fit file as shown in FIG. 8 (satellite location circled).

The satellite position extracted at the center of the streak is converted from the inertial celestial spherical frame (ECI RA, dec) to Earth-Centered, Earth Fixed coordinates using an initial guess of location, and then translated to (Lat, Lon) coordinates to determine first-order geo-position. The estimated location is used to determine the known satellite location, specified in the ECEF frame by the SP3 file, to an apparent celestial sphere location. This procedure is iterated, adjusting the estimated observer position until the measured the predicted satellite locations in the ECI frame match. Only a few iterations are required even for a fairly large initial estimate error.

Figure 9:
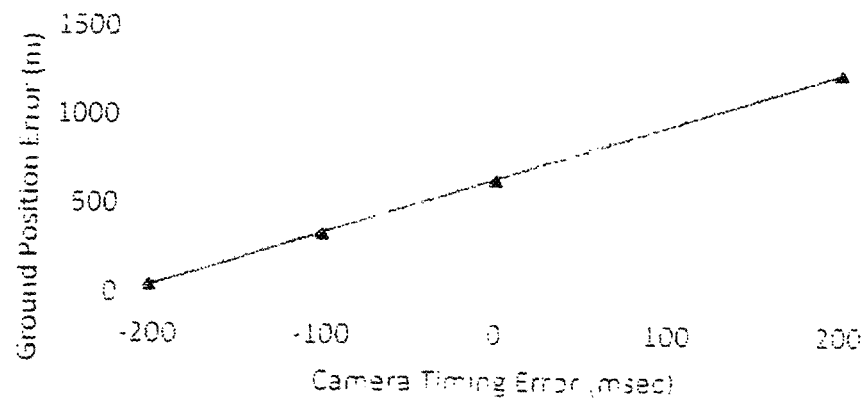
FIG. 9 shows a geo-positioning error from a single observation of a GPS satellite during midnight hole as a function of unknown offset between measurement time and camera trigger.

With the trigger offset set to −200 msec (roughly the lower bound of the trigger uncertainty), the geo-positioning error drops to 2.8 μrad, or <60 m (see FIG. 9). from a single measurement can be further reduced by averaging measurements from a number of GPS satellites over the midnight hole period.

Fast Steering Mirror

Figure 19:
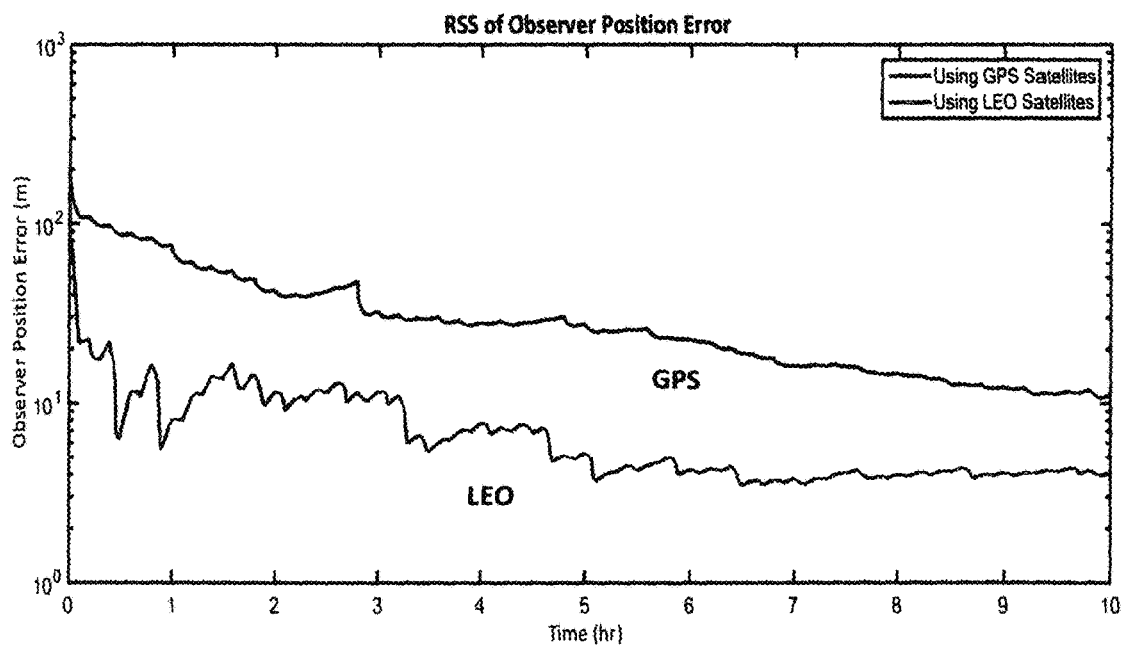
FIG. 19 shows observer position error vs time for imaging LEO satellite at daytime and GPS satellite at night.

A preferred modification to the dual-band design shown in FIG. 2 is shown in FIG. 19. This modified system includes a fast steering mirror as shown in FIG. 19. This modification permits fast and accurate tracking of the satellites by the visible light camera as shown in FIG. 8.

VARIATIONS

Persons skilled in the art of celestial navigation will recognize that many variations from or changes to the above description of preferred embodiments are possible within the general scope of the present invention. Therefore, the scope of the present invention is not to be limited by the above description of preferred embodiments, but the scope is to be determined by the appended claims and their legal equivalence.

We claim:

1. A high precision, automated dual band celestial navigation system for marine vessels comprising;
    A) an above-deck dual-band sheared-aperture telescope mounted on a gyro-stabilized four-axis pointing platform, adapted to image satellites and nearby stars within fields of view of the telescope, both day and night and
    B) a dual-band optical system comprising:
        1) a beam splitter adapted to separate light from the fields of view of the telescope into a visible light beam and a shortwave infrared beam,
        2) a shortwave infrared camera adapted to record light from the shortwave infrared beam and to create images of stars within the telescope field of view, said shortwave infrared camera comprising:
            a) an adjustable shortwave shutter with controls adapted to automatically control the shutter speed and
            b) a shortwave infrared sensor;
        3) a visible light camera adapted to collect light from the visible light beam and create images of satellites within the telescope field of view, said visible light camera comprising:
            a) a visible light shutter with controls adapted to automatically control the shutter speed and
            b) a visible light sensor;
    C) a processing unit adapted to function as a part of a position, navigation and timing (PNT) system, said processing unit comprising:
        1) an inertial measurement unit and
        2) a computer processing unit programmed with:
            a) an image processing algorithm,
            b) pointing algorithms,
            c) an Unscented Kalman filter,
            d) star and RSO catalogs,
            e) an all sky monitor algorithm,
            f) system control software, and interface software to the PNT system.

2. The automated dual band celestial navigation system as in claim 1 wherein the processing unit is located below deck on the marine vessel.

3. The automated dual band celestial navigation system as in claim 1 and further comprising an all sky monitoring system which provides an automated detection of clear line-of-sight to available satellites in partly cloudy sky.

4. The automated dual band celestial navigation system as in claim 1 and further comprising a fast steering mirror adapted to provide point-like control positions of the visible light beam on the visible light sensor when the telescope is tracking a satellite.

5. The automated dual band celestial navigation system as in claim 1 and further comprising a position, navigation and timing (PNT) system adapted to maintain position of the marine vehicle based on inertial measurement information when other sources of vehicle position information is not available.

6. The automated dual band celestial navigation system as in claim 1 and further comprising electronics adapted to control the telescope, the dual band optical system and the PNT system, above deck and below deck communications.

7. The automated dual band celestial navigation system as in claim 1 and further comprising an all sky monitoring system providing an automated detection of clear line-of-sight to available satellites in partly cloudy sky.

8. The automated dual band celestial navigation system as in claim 1 wherein the system is capable of geo-position determination of the marine vessels without GPS to within 5 meters during daytime and 20 meters during nighttime with a guaranteed geo-position determination of 25 meters during daytime and 100 meters during nighttime.

9. The automated dual band celestial navigation system as in claim 1 wherein shared aperture telescope is a catodioptric telescope.

10. The automated dual band celestial navigation system as in claim 1 wherein the star catalog star is a Skymark catalog.

11. The automated dual band celestial navigation system as in claim 1 wherein the RSO catalog is a United Space Command catalog.

\* \* \* \* \*